(12) United States Patent
Pareek et al.

(10) Patent No.: US 10,832,442 B2
(45) Date of Patent: Nov. 10, 2020

(54) DISPLAYING SMART GUIDES FOR OBJECT PLACEMENT BASED ON SUB-OBJECTS OF REFERENCE OBJECTS

(71) Applicant: Adobe Inc., San Jose, CA (US)

(72) Inventors: Vinay Pareek, Bikaner (IN); Mohan Sharma, Faridabad (IN)

(73) Assignee: Adobe Inc., San Jose, CA (US)

( * ) Notice: Subject to any disclaimer, the term of this patent is extended or adjusted under 35 U.S.C. 154(b) by 39 days.

(21) Appl. No.: 16/368,746

(22) Filed: Mar. 28, 2019

(65) Prior Publication Data

US 2020/0311974 A1    Oct. 1, 2020

(51) Int. Cl.
*G06T 7/73* (2017.01)
*G06T 7/174* (2017.01)

(52) U.S. Cl.
CPC ............... *G06T 7/74* (2017.01); *G06T 7/174* (2017.01)

(58) Field of Classification Search
CPC combination set(s) only.
See application file for complete search history.

(56) References Cited

U.S. PATENT DOCUMENTS

| 10,286,907 B2* | 5/2019 | Nishiguchi ......... B60W 30/162 |
| 10,427,679 B2 | 10/2019 | Van Dan Elzen et al. |
| 10,497,158 B2 | 12/2019 | Jain et al. |
| 2009/0067675 A1 | 3/2009 | Tan et al. |
| 2012/0307059 A1 | 12/2012 | Yamakage et al. |
| 2013/0063599 A1* | 3/2013 | Imai ................... G06K 9/00798 348/148 |
| 2015/0227800 A1 | 8/2015 | Takemae |
| 2015/0310283 A1* | 10/2015 | Mori ..................... B60W 10/20 382/104 |
| 2016/0063344 A1 | 3/2016 | Fan et al. |
| 2017/0151846 A1* | 6/2017 | Wuergler ................. B60D 1/62 |
| 2018/0001876 A1* | 1/2018 | Oikawa ............... B60T 8/17557 |
| 2018/0374345 A1* | 12/2018 | Suzuki ................. G08G 1/0112 |
| 2019/0156128 A1* | 5/2019 | Zhang .................. G06K 9/6256 |
| 2019/0168752 A1* | 6/2019 | Suzuki ..................... B62D 6/00 |
| 2019/0317519 A1* | 10/2019 | Chen ........................ G06T 7/536 |
| 2019/0317980 A1 | 10/2019 | Dhanuka et al. |
| 2019/0369626 A1* | 12/2019 | Lui ....................... G05D 1/0219 |
| 2020/0062255 A1 | 2/2020 | Fernando et al. |
| 2020/0189582 A1* | 6/2020 | Fukushige ............... G08G 1/16 |

OTHER PUBLICATIONS

"Final Office Action", U.S. Appl. No. 15/955,415, dated Feb. 21, 2020, 14 pages.
"Non-Final Office Action", U.S. Appl. No. 15/955,415, dated Sep. 20, 2019, 12 pages.

(Continued)

*Primary Examiner* — Cindy Trandai
(74) *Attorney, Agent, or Firm* — SBMC

(57) ABSTRACT

A smart guide display system generates one or more sub-objects for at least one of reference object in digital content, and each of these sub-objects is added to a set of reference objects. These sub-objects can be, for example, an edge of a reference object, a rectangle generated from a rectilinear reference object, or a freeform gradient color point included in a reference object. When a subject object is to be placed in digital content smart guides, such as equal distance guides or alignment guides, are displayed based on the objects in the set of reference objects.

20 Claims, 24 Drawing Sheets

(56) References Cited

OTHER PUBLICATIONS

"Pre-Interview First Office Action", U.S. Appl. No. 15/955,415, dated Oct. 18, 2019, 4 pages.
"Designing Type in Frontlab VI", Retrieved at: https://web.archive.org/web/20180317070815/https://help.fontlab.com/fontlab-vi/Using-Guidelines/, Mar. 17, 2018, 9 pages.
"Notice of Allowance", U.S. Appl. No. 15/955,415, dated Jun. 25, 2020, 15 pages.
"Notice of Allowance", U.S. Appl. No. 16/368,729, dated Aug. 6, 2020, 8 pages.

\* cited by examiner

DISPLAYING SMART GUIDES FOR OBJECT PLACEMENT BASED ON SUB-OBJECTS OF REFERENCE OBJECTS

BACKGROUND

As computer technology has advanced, the use of computers to create digital content has increased. Examples of this digital content includes pictures, drawings, or illustrations that are made up of multiple different objects. For example, a user may generate a picture of a musical instrument, a greeting card, a brochure to be printed or shared electronically, and so forth.

While computers facilitate the creation of digital content, the typical digital content creation process is not without its problems. One such problem is that it can be difficult for users to align the various different objects that make up the digital content. For example, a user may have already positioned two objects in the digital content and desire to place a third object equidistant from the two objects that have already been positioned. Some digital content creation programs attempt to solve this problem by displaying, in some situations, smart guides for the user that show the user where to place the object so it is aligned with other objects in the digital content, such as being equidistant from two other objects in the digital content. Unfortunately, the situations in which these programs display smart guides are limited. Because of these limitations, users are left with many situations for which smart guides are not displayed, leading to user frustration with their computers and digital content creation programs.

SUMMARY

To mitigate the problem of smart guides not being displayed in certain situations, a smart guide display system is employed to display smart guides based on sub-objects generated from other objects in the digital content. In accordance with one or more aspects of the smart guide display system, a first reference object of a set of one or more reference objects in digital content is identified. One or more sub-objects from the first reference object are generated and each is added to the set of reference objects as a reference object. A first distance in a first direction between a subject object and a first candidate reference object in the set of reference objects is determined, the first candidate reference object being one of the one or more sub-objects. A second distance in a second direction between the subject object and a second candidate reference object in the set of reference objects is determined, the first direction being opposite the second direction. A determination is made as to whether the first distance is within a threshold amount of the second distance, in response to the first distance being within the threshold amount of the second distance, equal distance guides between the subject object and the first candidate reference object, and between the subject object and the second candidate reference object are displayed.

In accordance with one or more aspects of the smart guide display system, a first reference object of a set of reference objects in digital content is identified, the first reference object being a rectilinear object. One or more sub-objects from the first reference object are generated by breaking the first reference object into multiple sub-objects that are rectangles and that together make up the first reference object. Each of the one or more sub-objects is added to the set of reference objects as a reference object, and a determination is made as to whether an edge of a subject object bounding box is approximately horizontally aligned or vertically aligned with an edge of a first candidate reference object, the first candidate reference object being one of the one or more sub-objects. In response to the edge of the subject object bounding box being approximately horizontally aligned or vertically aligned with the edge of the first candidate reference object, an alignment guide between the edge of the subject object bounding box and the edge of the first candidate reference object is displayed.

In accordance with one or more aspects of the smart guide display system, a first reference object of a set of reference objects in digital content is identified, the first reference object including one or more freeform gradient color points. One or more sub-objects from the first reference object are generated by identifying, as a sub-object, each of the one or more freeform gradient color points. Each of the one or more sub-objects is added to the set of reference objects as a reference object, and a determination is made as to whether a subject object is approximately horizontally aligned or vertically aligned with a first candidate reference object, the first candidate reference object being one of the one or more sub-objects. In response to the subject object being approximately horizontally aligned or vertically aligned with the first candidate reference object, an alignment guide between the subject object and the first candidate reference object is displayed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
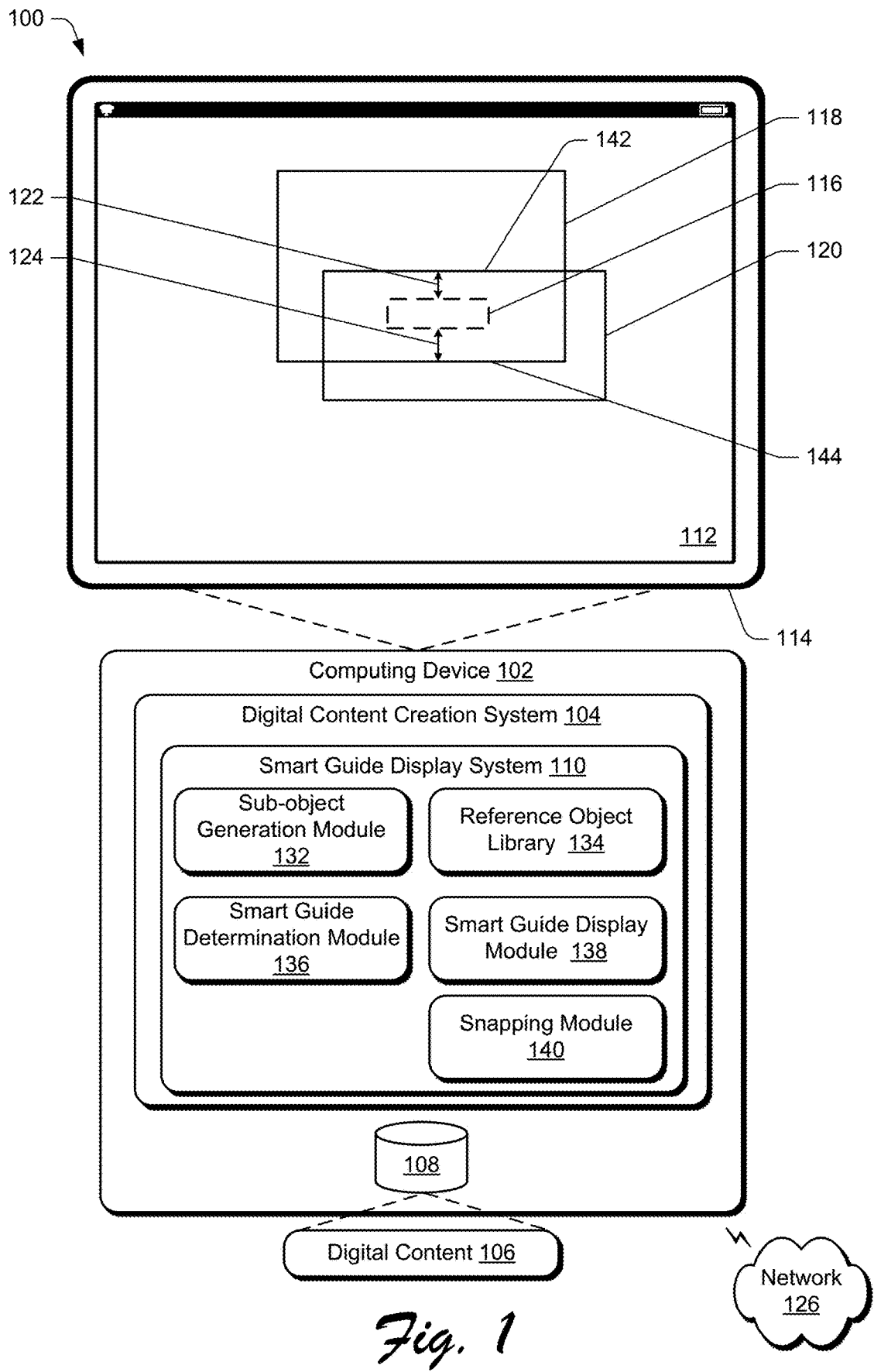
FIG. 1 is an illustration of a digital medium environment in an example implementation that is operable to employ the displaying smart guides for object placement based on sub-objects of reference objects techniques described herein.

Digital content creation programs allow users to create digital content. To help users create the digital content they desire, a digital content creation program displays smart guides. Smart guides refer to displayed indicators of the relationship between an object to be placed in digital content (e.g., an object being created or positioned in the digital content), referred to as a subject object, and one or more other objects already present in the digital content that are each referred to as a reference object. These reference objects can be, for example, objects in the digital content, other than the subject object, that are currently in view. The reference objects can also be objects in the digital content that are not visible to the user (e.g., an edge of bounding box of an object as discussed in more detail below). An object refers to a shape or art that can be displayed as part of digital content. For example, an object can be text, an image, a gif, a geometric shape, artwork, a freeform gradient color point, and so forth.

The subject object is an object that is currently selected by the user, and other objects in the digital content are referred to as reference objects. It should be noted that which object is the subject object can change over time. For example, when a particular object is the subject object, then another object is selected by the user, that other object becomes the subject object and the particular object becomes a reference object.

Candidate reference objects are also discussed herein. A candidate reference object is a reference object from which smart guides can be displayed based at least in part on the current location of the subject object. These candidate reference objects can be, for example, reference objects within a region of interest for a subject object bounding box, rectangles that make up a rectilinear object, freeform gradient color points within a same reference object as the subject object, and so forth.

One type of smart guide is an equal distance guide that is one or more lines, arrows, or other indicators that an object is approximately (e.g., within a threshold amount, such as 95% or 99%) an equal distance from one object as it is from another object. The use of an equal distance guide allows a user to quickly and easily position an object equidistant from two other objects.

Conventional digital content creation programs, however, do not display an equal distance guide to a reference object that is completely contained in or partially overlapping another object. Thus, for example, if digital content currently has a first rectangle inside a second rectangle, and a user desires to put a third rectangle inside the second rectangle and equidistant from the left side of the second rectangle and the right side of the first rectangle, an equal distance guide showing when the third rectangle is equidistant from the left side of the second rectangle and the right side of the first rectangle is not displayed to the user. This makes it tedious for the user to position the third rectangle where he or she desires, causing the user to expend additional time and computational resources to get the third rectangle positioned where he or she desires.

Conventional digital content creation programs also display equal distance guides based on bounding boxes of objects. The bounding box of an object is a rectangular area in which the object is contained, and is typically the smallest rectangular area that, using a 2-dimensional Cartesian coordinate system has top and bottom edges that are parallel to the x-axis, left and right edges that are parallel to the y-axis, and contains all of the object. It should be noted that the bounding box of an object can be, but need not be, the outline of the object itself. For example, if an object is a rectangle then the bounding box of the object is that rectangle. However, if an object is in the shape of a circle, then the bounding box of the object is not that circle. Rather, the bounding box is, for example, a smallest rectangular area in which that circle is contained.

The use of bounding boxes in some situations causes conventional digital content creation programs to display equal distance guides that reflect the bounding box but do not accurately reflect the actual object. For example, assume that digital content includes an object in an "E" shape and that the user desires to place a subject object between and equidistant from the lower two prongs of the "E" shape. Conventional digital content creation programs will rely on the bounding box of the "E" shape when displaying equal distance guides and will not display an equal distance guide showing when the subject object is equidistant from the lower two prongs of the "E" shape. This makes it tedious for the user to position the subject object where he or she desires, causing the user to expend additional time and computational resources to get the subject object positioned where he or she desires.

Conventional digital content creation programs also do not recognize freeform gradient color points as objects that can be the basis for smart guides. A freeform gradient color point is a point (e.g., a location of a single pixel) within a reference object that has a color value that can be set by the user. A user can position freeform gradient color points anywhere they desire within a reference object and set a color value for each of those freeform gradient color points. The color values from these various color points are diffused with each other inside the reference object to provide a smooth shading experience to the user. A user sometimes desires to place freeform gradient color points along a horizontal or vertical axis to give a uniform color appearance, or desires to place a freeform gradient color point equidistant from two other freeform gradient color points to give a symmetrical appearance to the design. Trying to do so manually, however, makes it tedious for the user to position freeform gradient color points where he or she desires, causing the user to expend additional time and computational resources to get the freeform gradient color points positioned where he or she desires.

To overcome these challenges, a digital content creation system includes a set of reference objects. A smart guide display system generates one or more sub-objects for at least one of these reference objects, and each of these sub-objects is added to the set of reference objects. These sub-objects can be, for example, an edge of a reference object bounding box, a rectangle generated from a rectilinear reference object, or a freeform gradient color point included in a reference object. When a subject object is to be placed in digital content, equal distance guides are displayed based on the objects in the set of reference objects. Thus, once included in the set of reference objects, the sub-objects can be used as objects from which equal distance guides can be displayed.

More specifically, in one or more implementations regions of interest for the subject object bounding box are identified. The regions of interest for the subject object bounding box extend outward from each edge of the bounding box to the edge of the digital content, and for each edge in a direction perpendicular to the edge of the bounding box and for the entire length of the edge of the bounding box. Reference objects with bounding boxes that at least partially overlap one of the regions of interest are identified. At least partially overlapping a region of interest refers to an object bounding box partially overlapping or being contained within the region of interest. These identified objects are referred to as candidate reference objects and are candidates for having equal distance guides displayed based on the locations of the subject object and the various candidate reference objects. Thus, for example, each reference object bounding box that the subject object bounding box at least partially overlaps (e.g., partially overlaps or is completely contained in) is identified as a candidate reference object.

For each of these candidate reference objects, one or more edges of the reference object bounding box is treated as a sub-object and is added to the set of reference objects. Distances from the subject object to these reference objects are determined. For each edge of the subject object bounding box, the nearest reference object in the set of reference objects to the edge is identified, and a distance between the edge and the nearest reference object is determined. If the distance from one edge of the subject object bounding box to the nearest reference object in a particular direction is within a threshold amount (e.g., 95% or 99%) of the distance from an opposite edge of the subject object bounding box to the nearest reference object in the opposite direction, then an equal distance smart guide for those directions is displayed. Furthermore, in such situations the subject object can also optionally be snapped to a location so that the distance from the one edge of the subject object bounding box to the nearest reference object in the particular direction is the same as the distance from the opposite edge of the subject object bounding box to the nearest reference object in the opposite direction. Thus, each edge of a reference object bounding box can be treated as a reference object itself, allowing equal distance guides to be displayed and subject objects to be snapped to locations based on edges of reference object bounding boxes in situations where the subject object bounding box at least partially overlaps a reference object bounding box.

Additionally or alternatively, in some situations the techniques discussed herein display equal distance guides based on the shapes of the reference objects regardless of the shapes of the reference object bounding boxes. From each reference object that is a rectilinear object (an object with all of its edges being parallel to either the x-axis or y-axis) that is not itself a rectangle, the smart guide display system generates multiple sub-objects that are rectangles and adds those sub-objects to the set of reference objects. For each edge of the subject object bounding box, the nearest reference object in the set of reference objects to the edge is identified, and a distance between the edge of the subject object bounding box and the nearest reference object is determined. If the distance in a particular direction from one edge of the subject object bounding box to the nearest reference object is within a threshold amount (e.g., 95% or 99%) of the distance from an opposite edge of the subject object bounding box to the nearest reference object in the opposite direction, then an equal distance smart guide for those directions is displayed. Furthermore, in such situations the subject object can also optionally be snapped to a location so that the distance from the one edge of the subject object bounding box to the nearest reference object in the particular direction is the same as the distance from the opposite edge of the subject object bounding box to the nearest reference object in the opposite direction. Thus, each rectangle that makes up part of a rectilinear reference object can be treated as a reference object itself, allowing equal distance guides to be displayed and subject objects to be snapped to locations based on rectangular portions of a reference object regardless of the bounding box of the reference object.

Additionally or alternatively, in some situations the techniques discussed herein display equal distance guides based on freeform gradient color points. From each reference object that includes freeform gradient color points, the smart guide display system generates multiple sub-objects that are each a freeform gradient color point and adds those sub-objects to the set of reference objects. For each subject object that is a freeform gradient color point, the nearest reference object in the set of reference objects to the subject object in each of multiple directions (e.g., left and right along the x-axis, up and down along the y-axis) is identified, and a distance between the subject object and the nearest reference object is determined. The nearest reference object may be any reference object, or the smart guide display system may only select another reference object that is a freeform gradient color point as the nearest reference object. If the distance to the nearest reference object in a particular direction is within a threshold amount (e.g., 95% or 99%) of the distance to the nearest reference object in the opposite direction then an equal distance smart guide for those directions is displayed. Furthermore, in such situations the subject object can also optionally be snapped to a location so that the distance to the nearest reference object in the particular direction is the same as the distance to the nearest reference object in the opposite direction.

For a subject object that is not a freeform gradient color point, a location on each edge of a bounding box of the subject object is used to determine a distance between the subject object and the nearest reference object that is a freeform gradient color point. These edge locations can be, for example, a center point of each edge of the subject object bounding box. The nearest reference object in the set of reference objects to the edge location in each of multiple directions (e.g., left and right along the x-axis, up and down along the y-axis) is identified, and the distance between the edge location and the nearest reference object is determined. If the distance from one edge location of the subject object bounding box to the nearest reference object in a particular direction is within a threshold amount (e.g., 95% or 99%) of the distance from a location on an opposite edge of the subject object bounding box to the nearest reference object in the opposite direction, then an equal distance smart guide for those directions is displayed. Furthermore, in such situations the subject object can also optionally be snapped to a location so that the distance from the one edge location to the nearest reference object in the particular direction is the same as the distance from the location on the opposite edge to the nearest reference object in the opposite direction.

Thus, each freeform gradient color point can be treated as a reference object itself, allowing equal distance guides to be displayed and subject objects to be snapped to locations based on freeform gradient color points in a reference object.

Another type of smart guide is an alignment guide that is a line or other indicator of how one object is aligned with another object, such as a line showing that two objects have edges along the same x-axis line or y-axis line. The use of an alignment guide allows a user to quickly and easily position an object so that the edge of the object is horizontally or vertically aligned with the edge of another object.

Conventional digital content creation programs, however, display alignment based on bounding boxes of objects. The use of bounding boxes in some situations causes conventional digital content creation programs to display alignment guides that reflect the bounding box but do not accurately reflect the actual object. For example, assume that digital content includes an object in an "E" shape and that the user desires to place a subject object to the right of and horizontally aligned with the top edge of the middle prong of the "E" shape. Conventional digital content creation programs will rely on the bounding box of the "E" shape when displaying alignment guides and will not display an alignment guide showing when the subject object is horizontally aligned with the top edge of the middle prong of the "E" shape. This makes it tedious for the user to position the object where he or she desires, causing the user to expend additional time and computational resources to get the subject object positioned where he or she desires.

As discussed above, conventional digital content creation programs also do not recognize freeform gradient color points as objects that can be the basis for smart guides. Thus, conventional digital content creation programs do not display alignment based on freeform gradient color points. This makes it tedious for the user to position freeform gradient color points where he or she desires, causing the user to expend additional time and computational resources to get the freeform gradient color points positioned where he or she desires.

To overcome these challenges, the smart guide display system generates one or more sub-objects for at least one reference object, and each of these sub-objects is added to the set of reference objects as discussed above. When a subject object is to be placed in digital content, alignment guides are displayed based on the objects in the set of reference objects. Thus, once included in the set of reference objects, the sub-objects can be used as objects from which alignment guides can be based.

More specifically, in situations in which a reference object is a rectilinear object that is itself not a rectangle, the smart guide display system displays alignment guides based on the shape of the reference object regardless of the shape of the reference object bounding box. From each reference object that is a rectilinear object that is not itself a rectangle, the smart guide display system generates multiple sub-objects that are rectangles and adds those sub-objects to the set of reference objects as discussed above. The bounding boxes of each such rectangle is the rectangle itself, thus an alignment guide can be displayed between the bounding box of the subject object and the rectangle regardless of the shape of the rectilinear object that the rectangle was generated from. For each edge of the bounding box of the subject object, the smart guide display system determines whether the edge of the subject object bounding box is approximately horizontally aligned or approximately vertically aligned with the edge of a reference object bounding box in the set of reference objects. An edge of the subject object bounding box and an edge of a reference object bounding box are approximately horizontally aligned if the value of the y coordinate of the edge of the subject object bounding box is approximately equal to the value of the y coordinate of the edge of the reference object bounding box, and an edge of the subject object bounding box and an edge of a reference object bounding box are approximately vertically aligned if the value of the x coordinate of the edge of the subject object bounding box is approximately equal to the value of the x coordinate of the edge of the reference object bounding box. Two values are approximately equal if the two values are the same or within a threshold amount (e.g., 95% or 99%) of one another. If the edge of the subject object bounding box is approximately horizontally aligned or vertically aligned with the edge of a reference object bounding box in the set of reference objects then an alignment guide is displayed. Furthermore, in such situations the subject object can also optionally be snapped to a location so that the edge of the subject object bounding box is horizontally aligned or vertically aligned with the edge of the reference object bounding box. Thus, each rectangle that makes up part of a rectilinear reference object can be treated as a reference object itself, allowing alignment guides to be displayed and subject objects to be snapped to locations based on rectangular portions of the rectilinear object regardless of the bounding box of the rectilinear object.

Additionally or alternatively, in some situations the smart guide display system displays alignment guides based on freeform gradient color points. From each reference object that includes freeform gradient color points, the smart guide display system generates multiple sub-objects that are each a freeform gradient color point and adds those sub-objects to the set of reference objects as discussed above. For each subject object that is a freeform gradient color point, the smart guide display system determines whether the subject object is approximately horizontally aligned or approximately vertically aligned with a reference object (or an edge of a reference object bounding box) in the set of reference objects. The smart guide display system may consider all reference objects in the set of reference objects, or only other reference objects that are freeform gradient color points. If the subject object is approximately horizontally aligned or approximately vertically aligned with the reference object (or an edge of a reference object bounding box) in the set of reference objects then an alignment guide is displayed. Furthermore, in such situations the subject object can also optionally be snapped to a location so that the subject object is horizontally aligned or vertically aligned with the reference object (or an edge of the reference object bounding box).

For each subject object location that is not a freeform gradient color point, the smart guide display system determines whether an edge of the subject object bounding box is approximately horizontally aligned or approximately vertically aligned with a reference object in the set of reference objects. For this determination, the smart guide display system may consider only other reference objects that are freeform gradient color points. If the edge of the subject object bounding box is approximately horizontally aligned or approximately vertically aligned with a reference object in the set of reference objects then an alignment guide is displayed. Furthermore, in such situations the subject object can also optionally be snapped to a location so that the edge of the subject object bounding box is horizontally aligned or vertically aligned with the edge of the reference object.

Thus, each freeform gradient color point can be treated as a reference object itself, allowing alignment guides to be displayed and subject objects to be snapped to locations based on freeform gradient color points in a reference object.

The techniques discussed herein improve the operation of a computing device by making it easier for users to quickly and accurately create the digital content they desire. Displaying the smart guides based on sub-objects of reference objects reduces the time it takes for users to align a first object with reference objects that are completely contained in or partially overlap other reference objects, align a first object with the shape of a reference object rather than the reference object's bounding box, align a first object with freeform gradient color points, and/or align a freeform gradient close proximity with other reference objects. Additionally, snapping objects to particular locations reduces the time it takes for users to place objects at the locations the users desire. This provides for efficient use of computational resources by reducing the amount of time computational resources are expended in creating digital content. For example, as a result of the time savings the computing device need not run the digital content creation system for as long, resulting in reduced energy usage by the computing device.

Furthermore, the techniques discussed herein allow users to quickly and accurately create the digital content they desire on some computing devices that would otherwise be impractical or difficult to generate. For example, on computing devices with small displays, such as digital cameras or smart phones, the small size of the display may make it difficult for a user to interact with the device in order to accurately position objects in the digital content where they desire. By way of another example, on computing devices without certain input devices (e.g., computing devices lacking a stylus or mouse), the lack of such input devices can make it difficult for a user to interact with the device in order to accurately position objects in the digital content where they desire. These difficulties are alleviated by displaying the smart guides, and optionally snapping objects to particular locations.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the displaying smart guides for object placement based on sub-objects of reference objects techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 28.

The computing device 102 is illustrated as including a digital content creation system 104 that processes and transforms digital content 106, which is illustrated as maintained in storage 108 of the computing device 102. The digital content creation system 104 includes a smart guide display system 110 that is implemented at least partially in hardware of the computing device 102 to process and transform the digital content 106. Such processing includes the placement of objects within the digital content 106, the display of smart guides (e.g., equal distance guides, alignment guides) associated with the digital content 106, snapping objects to locations indicated by smart guides, and rendering of the objects and smart guides associated with the digital content 106 in a user interface 112 for output, e.g., by a display device 114. For example, such processing includes the placement of a subject object 116 within the digital content 106 relative to two reference objects 118 and 120, and the display of equal distance guides 122 and 124 indicating that the subject object 116 is equidistant from an edge of the reference object 118 and an edge of the reference object 120.

The storage 108 can be any of a variety of different types of storage, such as random access memory (RAM), Flash memory, solid state drive, magnetic disk drive, and so forth. Although illustrated as implemented locally at the computing device 102, functionality of the smart guide display system 110 may also be implemented in whole or part via functionality available via the network 126, such as part of a web service or "in the cloud."

An example of functionality incorporated by the smart guide display system 110 to process the digital content 106 is illustrated as a sub-object generation module 132, a reference object library 134, a smart guide determination module 136, a smart guide display module 138, and a snapping module 140. The sub-object generation module 132 implements functionality to generate one or more sub-objects from a reference object. These sub-objects can be, for example, edges of a reference object, rectangles that make up a reference object, freeform gradient color points, and so forth. The reference object library 134 implements functionality to maintain a set of reference objects included in the digital content 106, including sub-objects generated by the sub-object generation module 132. The smart guide determination module 136 implements functionality to generate smart guides between a subject object and one or more reference objects in the set of reference objects, such as equal distance guides and alignment guides. The smart guide display module 138 implements functionality to display on the display device 114 the smart guides generated by the smart guide determination module 136. The snapping module 140 implements functionality to snap a subject object to a particular location in response to the subject object being within a threshold distance of being equidistant from two reference objects or within a threshold distance of being aligned with a reference object.

It should be noted that the sub-objects generated by the sub-object generation module 132 and maintained in the reference object library 134 need not be, and typically are not, displayed on the display device 114. For example, bounding box edges may not be displayed. By way of another example, rectangles generated from a rectilinear object are not displayed, although portions of those rectangles can be displayed as part of the display of the rectilinear object. Despite not being displayed, the location of these sub-objects is known and can be used by the smart guide determination module 136 to generate smart guides.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, modules, features, and concepts described in relation to different example environments, devices, components, figures, and procedures herein may be used in any suitable combinations and are not limited to the particular combinations represented by the enumerated examples in this description.

Smart Guide Display System Architecture

Figure 2:
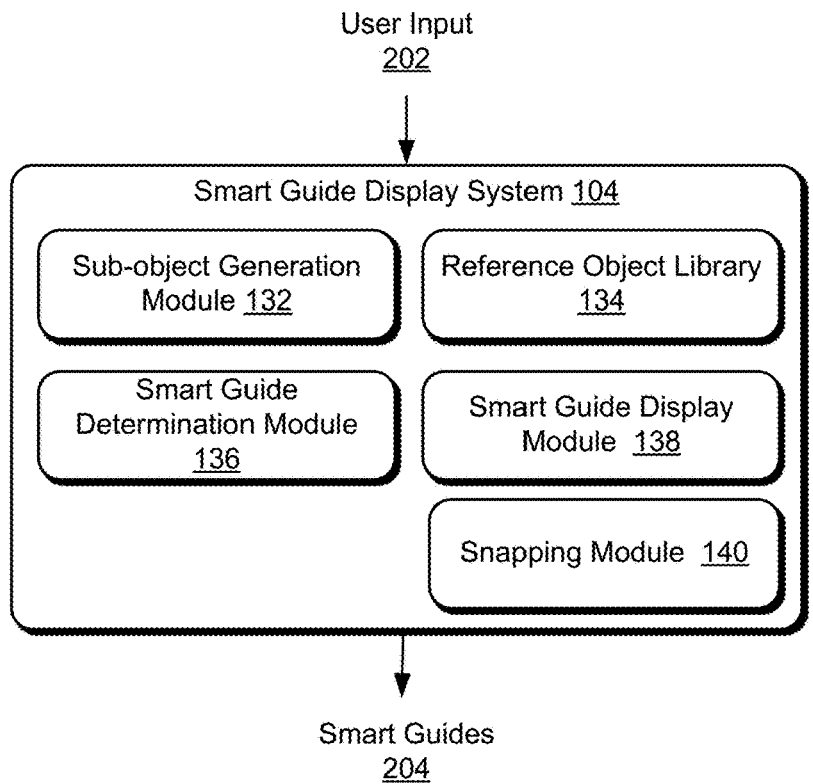
FIG. 2 is an illustration of an example architecture of a smart guide display system.

FIG. 2 is an illustration of an example architecture of a smart guide display system 110. The smart guide display system 110 includes a sub-object generation module 132, a reference object library 134, a smart guide determination module 136, a smart guide display module 138, and a snapping module 140. The smart guide display system 110 receives user input 202 to place a subject object and implements functionality to generate and display smart guides 204 based on the location of the subject object and reference objects of the digital content 106. The user input 202 can be received in any of a variety of manners, such as movement of a finger or stylus across a touchscreen, movement of a cursor control device such as a mouse, audible inputs, and so forth.

The reference object library 134 implements functionality to maintain a set of reference objects included in the digital content 106. These reference objects include previously generated objects as well as sub-objects generated by the sub-object generation module 132. The reference object library can maintain the reference objects in various manners, such as in a data structure in random access memory of the computing device 102, in nonvolatile memory of the computing device 102, and so forth.

The sub-object generation module 132 implements functionality to generate one or more sub-objects from a reference object. The sub-object generation module 132 can generate sub-objects from the edges of bounding boxes of one or more reference objects. The sub-object generation module 132 can generate sub-objects from the bounding box edges of all of the reference objects, or alternatively generates sub-objects from only particular bounding box edges of particular reference objects. In situations in which the sub-object generation module 132 generates sub-objects from only particular bounding box edges of particular reference objects, the sub-object generation module 132 identifies the particular bounding box edges and particular reference objects based on the location of the subject object and the reference objects in the digital content (as maintained in the reference object library 134). It should be noted that user input can be received to move the subject object around the digital content being created, and as the subject object is moved the particular bounding box edges and the particular reference objects can vary.

In one or more implementations, the sub-object generation module 132 iterates over the objects in the digital content (as maintained in the reference object library 134) and identifies the closest reference object bounding box edges surrounding the subject object in one or more regions of interest. These regions of interest are dependent on the edges of the subject object bounding box. The sub-object generation module 132 generates sub-objects from one or more bounding box edges of the reference object bounding box edges in these regions of interest. By generating sub-objects from one or more bounding box edges of only the reference object bounding boxes in these regions of interest, the amount of time and computational resources expended for the sub-object generation module 132 to generate the sub-objects can be reduced compared to generating sub-objects from bounding box edges of all the reference objects.

Figure 3:
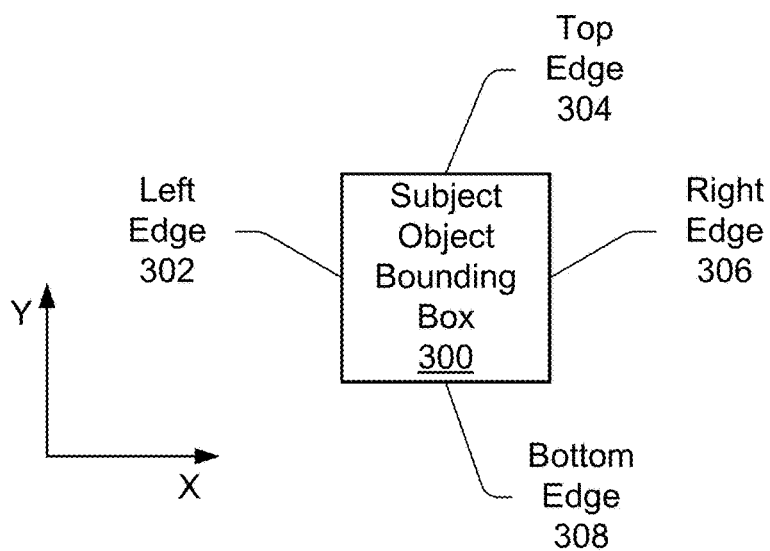
FIG. 3 illustrates an example subject object bounding box.

FIG. 3 illustrates an example subject object bounding box 300. The bounding box 300 is a rectangular area in which the subject object is contained, and in one or more implementations is the smallest rectangular area that contains all of the subject object. The subject object can be the same size and shape as the bounding box 300, or any of a variety of other geometric shapes (e.g., circles, triangles, other polygons, shapes with various arcs or curves, and so forth).

The edges of a bounding box are the outside limits of the bounding box. The subject object bounding box 300 includes four edges: left edge 302, top edge 304, right edge 306, and bottom edge 308. Using a 2-dimensional Cartesian coordinate system, the top edge 304 and the bottom edge 308 are parallel to the x-axis, and the left edge 302 and the right edge 306 are parallel to the y-axis.

Figure 4:
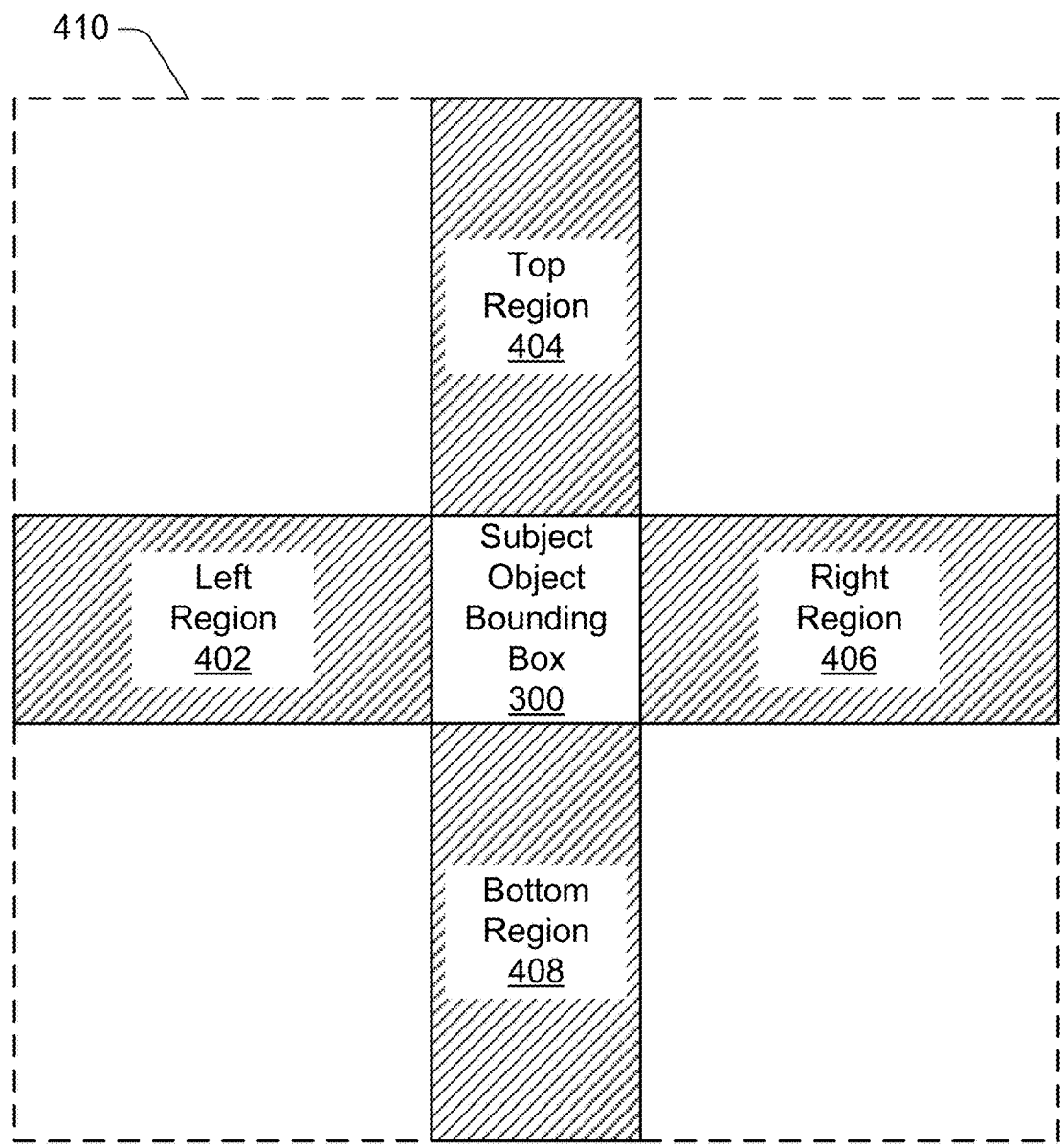
FIG. 4 illustrates an example of regions of interest for a subject object bounding box.

FIG. 4 illustrates an example of regions of interest for the subject object bounding box 300. The regions of interest for a bounding box extend outward from each edge of the bounding box to the edge of the digital content, and for each edge in a direction perpendicular to the edge of the bounding box of the subject object and for the entire length of the edge of the bounding box of the subject object. Thus, for the subject object bounding box 300, the regions of interest are shown as a left region 402, a top region 404, a right region 406, and a bottom region 408. The left region 402, illustrated with diagonal lines, is a rectangular region that extends outward from the left edge of the subject object bounding box 300 to the edge of the digital content, illustrated by dashed line 410, for the entire length of the left edge of the subject object bounding box 300. The top region 404, illustrated with diagonal lines, is a rectangular region that extends outward from the top edge of the subject object bounding box 300 to the edge of the digital content for the entire length of the top edge of the subject object bounding box 300. The right region 406, illustrated with diagonal lines, is a rectangular region that extends outward from the right edge of the subject object bounding box 300 to the edge of the digital content for the entire length of the right edge of the subject object bounding box 300. The bottom region 408, illustrated with diagonal lines, is a rectangular region that extends outward from the bottom edge of the subject object bounding box 300 to the edge of the digital content for the entire length of the bottom edge of the subject object bounding box 300.

The sub-object generation module 132 determines the regions of interest for the subject object and identifies reference objects with bounding boxes that at least partially overlap one of the regions of interest. At least partially overlapping a region of interest refers to an object bounding box partially overlapping or being contained within the region of interest. These identified objects are referred to as candidate reference objects and are candidates for having equal distance guides displayed based on the location of the subject object and the various candidate reference objects.

Figure 5:
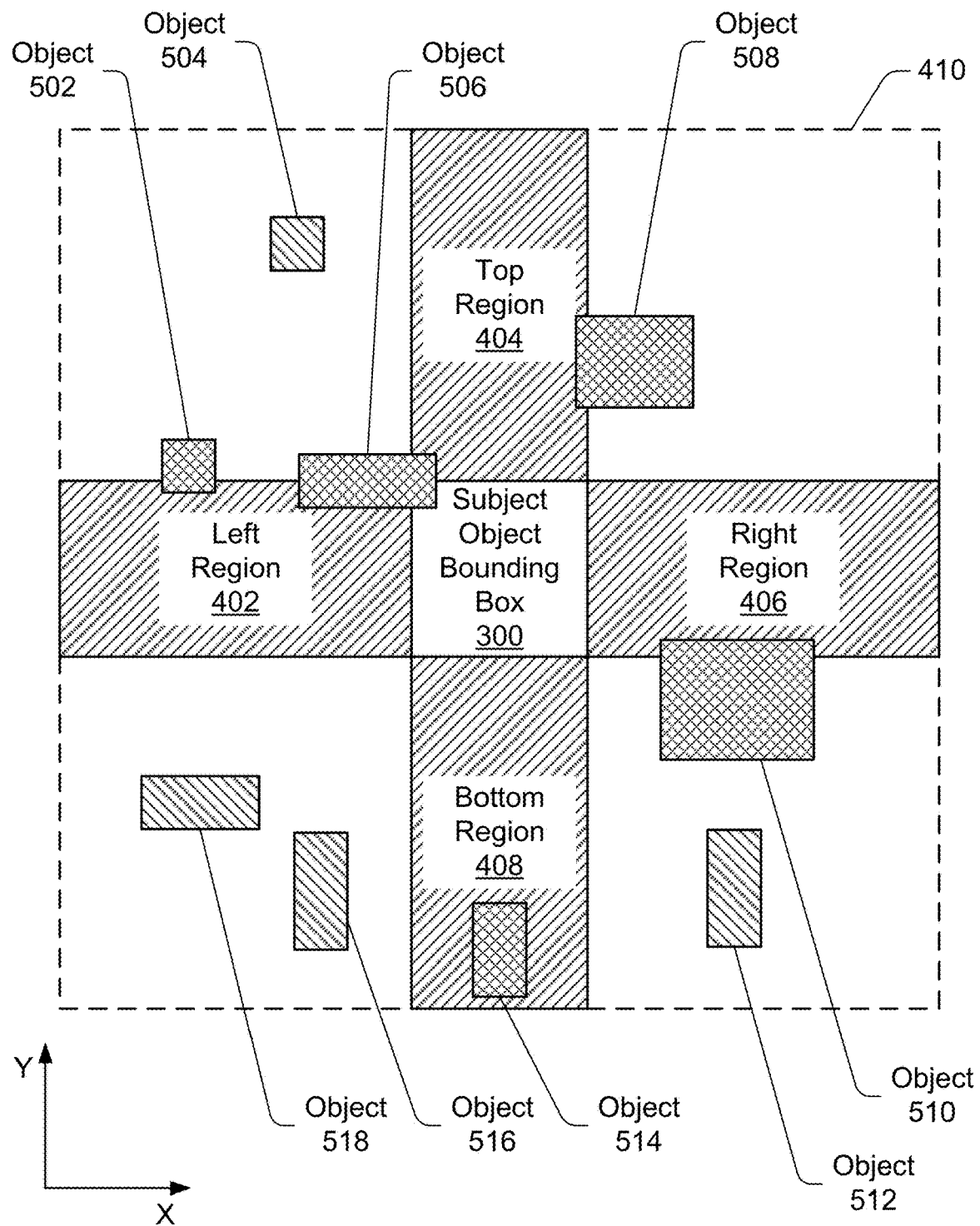
FIG. 5 illustrates an example of regions of interest and candidate reference objects for a subject object bounding box.

FIG. 5 illustrates an example of regions of interest and candidate reference objects for a subject object bounding box 300. Illustrated in FIG. 5 are the subject object bounding box 300, the left region 402, the top region 404, the right region 406, and the bottom region 408. The bounding boxes of several reference objects 502, 504, 506, 508, 510, 512, 514, 516, and 518 are illustrated. The bounding boxes of reference objects 502, 506, 508, and 510 each partially overlap at least one of the regions 402, 404, 406, and 408. Reference object 514 is contained within the region 408. Accordingly, reference objects 502, 506, 508, 510, and 514, illustrated with cross-hatch fill, are candidate reference objects. Bounding boxes of reference objects 504, 512, 516, and 518 neither partially overlap nor are contained within any of the regions 402, 404, 406, and 408. Accordingly, reference objects 504, 512, 516, and 518, illustrated with diagonal line fill, are not candidate reference objects.

In one or more implementations, the sub-object generation module 132 generates sub-objects from the bounding box edges of the candidate reference objects but does not generate sub-objects from the bounding box edges of reference objects that are not candidate reference objects. Accordingly, the sub-object generation module 132 generates sub-objects from the bounding box edges of candidate reference objects 502, 506, 508, 510, and 514, but does not generate sub-objects from the bounding box edges of the reference objects 504, 512, 516, and 518.

The sub-object generation module 132 generates a sub-object from a bounding box edge of a candidate reference object by generating an object that is located at the same location as the edge, has the same length as the edge, and has a small width. This width is smaller than the width of the candidate reference object and can be, for example, one pixel, a width equal to the width or weight of a line that is the edge, and so forth. The sub-object generation module 132 then adds these sub-objects to the reference object library 134. It should be noted that a sub-object generated from a bounding box edge is a rectangle, so the bounding box of the sub-object is that rectangle. Information indicating which bounding box edge the sub-object was generated from is also optionally maintained (e.g., maintained as metadata associated with the sub-object in the reference object library 134).

In one or more implementations, the sub-object generation module 132 generates sub-objects from only particular bounding box edges of the candidate reference objects. For a candidate reference object, the sub-object generation module 132 determines which region(s) the candidate reference object is in and generates sub-objects from only particular bounding box edges of that candidate reference object depending on which region(s) the object is in. For a particular candidate reference object that at least partially overlaps a single region, the sub-object generation module 132 generates a sub-object for the bounding box edge of the particular candidate reference object that is closest to the bounding box edge of the subject object that corresponds to the region. The sub-object generation module 132 does not generate sub-objects for bounding box edges of the particular candidate reference object that are not closest to the bounding box edge of the subject object that corresponds to the region. For a particular candidate reference object that at least partially overlaps multiple regions, the sub-object generation module 132 generates a sub-object for each bounding box edge of the particular candidate reference object that does not overlap the subject object bounding box as per the corresponding region (e.g., the top bounding box edge if the particular reference object at least partially overlaps the top region).

For example, if a candidate reference object is in the top region 404 and does not overlap the subject object bounding box 300, then the sub-object generation module 132 generates a sub-object from the bottom bounding box edge of the candidate reference object because the bottom bounding box edge of the candidate reference object is the closest bounding box edge of the candidate reference object to the top bounding box edge of the subject object. However, if a candidate reference object is in the top region 404 and overlaps the subject object bounding box 300, then the sub-object generation module 132 generates a sub-object from the top bounding box edge of the candidate reference object because the bottom bounding box edge of the candidate reference object overlaps the subject object bounding box 300.

By way of another example, if a candidate reference object is in the right region 406 and does not overlap the subject object bounding box 300, then the sub-object generation module 132 generates a sub-object from the left bounding box edge of the candidate reference object because the left bounding box edge of the candidate reference object is the closest bounding box edge of the candidate reference object to the right bounding box edge of the subject object. However, if a candidate reference object is in the right region 406 and overlaps the subject object bounding box 300, then the sub-object generation module 132 generates a sub-object from the right bounding box edge of the candidate reference object because the left bounding box edge of the candidate reference object overlaps the subject object bounding box 300.

By way of another example, if a candidate reference object is in the bottom region 408 and does not overlap the subject object bounding box 300, then the sub-object generation module 132 generates a sub-object from the top bounding box edge of the candidate reference object because the top bounding box edge of the candidate reference object is the closest bounding box edge of the candidate reference object to the bottom bounding box edge of the subject object. However, if a candidate reference object is in the bottom region 408 and overlaps the subject object bounding box 300, then the sub-object generation module 132 generates a sub-object from the bottom bounding box edge of the candidate reference object because the top bounding box edge of the candidate reference object overlaps the subject object bounding box 300.

By way of another example, if a candidate reference object is in the left region 402 and does not overlap the subject object bounding box 300, then the sub-object generation module 132 generates a sub-object from the right bounding box edge of the candidate reference object because the right bounding box edge of the candidate reference object is the closest bounding box edge of the candidate reference object to the left bounding box edge of the subject object. However, if a candidate reference object is in the left region 402 and does overlap the subject object bounding box 300, then the sub-object generation module 132 generates a sub-object from the left bounding box edge of the candidate reference object because the right bounding box edge of the candidate reference object overlaps the subject object bounding box 300.

Thus, referring to FIG. 5, the sub-object generation module 132 generates a sub-object from the right bounding box edge of candidate reference object 502, a sub-object from the left bounding box edge of candidate reference object

506, a sub-object from the top bounding box edge of candidate reference object 506, a sub-object from the bottom bounding box edge of candidate reference object 508, a sub-object from the left bounding box edge of candidate reference object 510, and a sub-object from the top bounding box edge of candidate reference object 514.

Additionally or alternatively, the sub-object generation module 132 can generate sub-objects from bounding box edges of candidate reference objects regardless of which region(s) the candidate reference object is in. For example, the sub-object generation module 132 can generate sub-objects from all bounding box edges of candidate reference objects.

The smart guide determination module 136 identifies the closest candidate reference object to the subject object in each direction. The closest candidate reference object to the subject object in a particular direction is the candidate reference object having the smallest distance in that particular direction to a bounding box edge of the subject object. For example, in a 2-dimensional Cartesian coordinate system, the distance in the vertical direction is, for a given x value that is the same for the candidate reference object and the subject object, the absolute value of the difference between the y value for the candidate reference object and the y value of the subject object. By way of another example, the distance in the horizontal direction is, for a given y value that is the same for the candidate reference object and the subject object, the absolute value of the difference between the x value for the candidate reference object and the x value of the subject object. Accordingly, the sub-object generation module 136 identifies the closest candidate reference object to the top of the subject object, the closest candidate reference object to the left of the subject object, the closest candidate reference object to the right of the subject object, and the closest candidate reference object to the bottom of the subject object.

The smart guide determination module 136 also calculates the distance between the subject object and the closest candidate reference object in each direction, which is also referred to as the gap distance. These distances are based on the bounding box edges of the subject object and the closest candidate reference objects in each direction. Given these distances, the smart guide determination module 136 determines whether the distances in the same dimension but opposite directions are approximately equal. Two distances being approximately equal refers to the two distances being the same or within a threshold amount (e.g., 95% or 99%) of one another. In response to determining that the two distances are approximately equal, the smart guide determination module 136 notifies the smart guide display module 138 to display equal distance guides. The equal distance guides are one or more lines, arrows, or other indicators that the subject object is approximately equidistant from the two nearest candidate reference objects in opposite directions of the same dimension.

For example, if the smart guide determination module 136 determines that the distance between the left bounding box edge of the subject object and the right bounding box edge of the nearest candidate reference object in the left direction from the subject object is approximately equal to the distance between the right bounding box edge of the subject object and the left bounding box edge of the nearest candidate reference object in the right direction from the subject object, then the smart guide determination module 136 notifies the smart guide display module 138 to display equal distance guides between the left bounding box edge of the subject object and the right bounding box edge of the nearest candidate reference object in the left direction and between the right bounding box edge of the subject object and the left bounding box edge of the nearest candidate reference object in the right direction. By way of another example, if the smart guide determination module 136 determines that the distance between the top bounding box edge of the subject object and the bottom bounding box edge of the nearest candidate reference object in the top direction from the subject object is approximately equal to the distance between the bottom bounding box edge of the subject object and the top bounding box edge of the nearest candidate reference object in the bottom direction from the subject object, then the smart guide determination module 136 notifies the smart guide display module 138 to display equal distance guides between the top bounding box edge of the subject object and the bottom bounding box edge of the nearest candidate reference object in the top direction and between the bottom bounding box edge of the subject object and the top bounding box edge of the nearest candidate reference object in the bottom direction.

The snapping module 140 implements functionality to snap a subject object to a particular location that is equidistant from two reference objects in response to the subject object not being equidistant from the two reference objects but being within a threshold distance of (e.g., 95% or 99% of) being equidistant from two reference objects. Snapping the subject object to a particular location refers to moving or changing the location of the subject object in a direction parallel to the direction of the two reference objects. For example, if the two reference objects are to the left and right of the subject object, then the subject object is moved to the left or right (but not up or down) so that the subject object is equidistant from the two reference objects. By way of another example, if the two reference objects are to the top and bottom of the subject object, then the subject object is moved to the top or bottom (but not left or right) so that the subject object is equidistant from the two reference objects. Thus, in addition to displaying the equal distance guides between the bounding box edges of the subject object and the bounding box edges of the two reference objects, the subject object can also be snapped to the location that is equidistant from the two reference objects.

The equal distance guides can take any of a variety of different forms. For example, the equal distance guides can be two lines, each with arrows at both ends and each extending from the subject object bounding box to one of the two nearest candidate reference object bounding boxes in a given direction that are approximately equidistant from the subject object. The equal distance guides can be displayed anywhere along the bounding box edges of the subject object and the two nearest candidate reference object bounding boxes in a given direction, or beyond one of the edges by using extension lines. The smart guide determination module 136 optionally displays extension lines from one or both of the subject object and a candidate reference object to facilitate viewing of the equal distance guides. The equal distance guides can be the same color as one or more reference objects or the subject object, or alternatively can be different colors.

Figure 6:
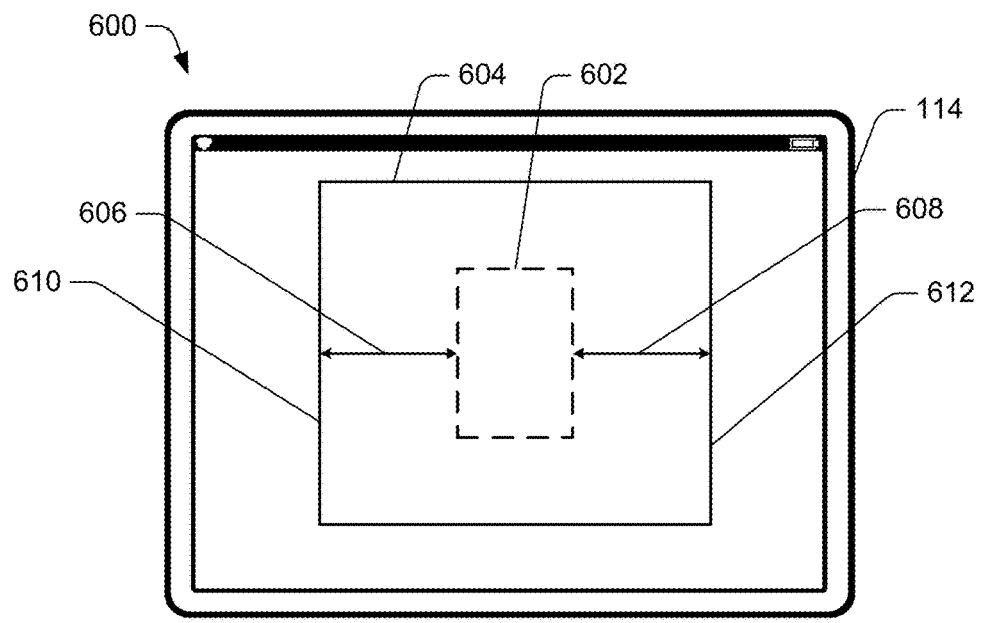
FIGS. 6, 7, 8, 9, 10, 11, and 12 illustrate examples of displaying equal distance guides using the techniques discussed herein.

FIG. 6 illustrates an example 600 of displaying equal distance guides using the techniques discussed herein. In the example 600, a subject object bounding box 602 is displayed as contained within a reference object bounding box 604 on a display device 114. Equal distance guides 606 and 608 indicate that the subject object bounding box 602 is equidistant from edges 610 and 612 of the reference object bounding box 604. Thus, as illustrated in example 600, equal distance guides can be displayed based on a single reference object, and can be displayed even if there is only a single reference object.

Figure 7:
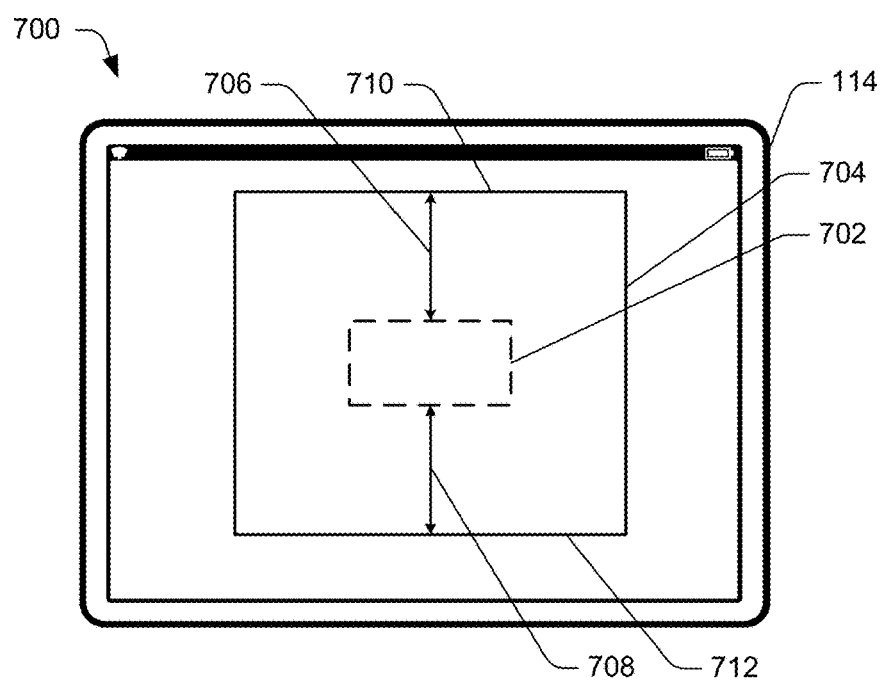

FIG. 7 illustrates another example 700 of displaying equal distance guides using the techniques discussed herein. In the example 700, a subject object bounding box 702 is displayed as contained within a reference object bounding box 704 on a display device 114. Equal distance guides 706 and 708 indicate that the subject object bounding box 702 is equidistant from edges 710 and 712 of the reference object bounding box 704. Thus, as illustrated in example 700, equal distance guides can be displayed based on a single reference object, and can be displayed even if there is only a single reference object.

Figure 8:
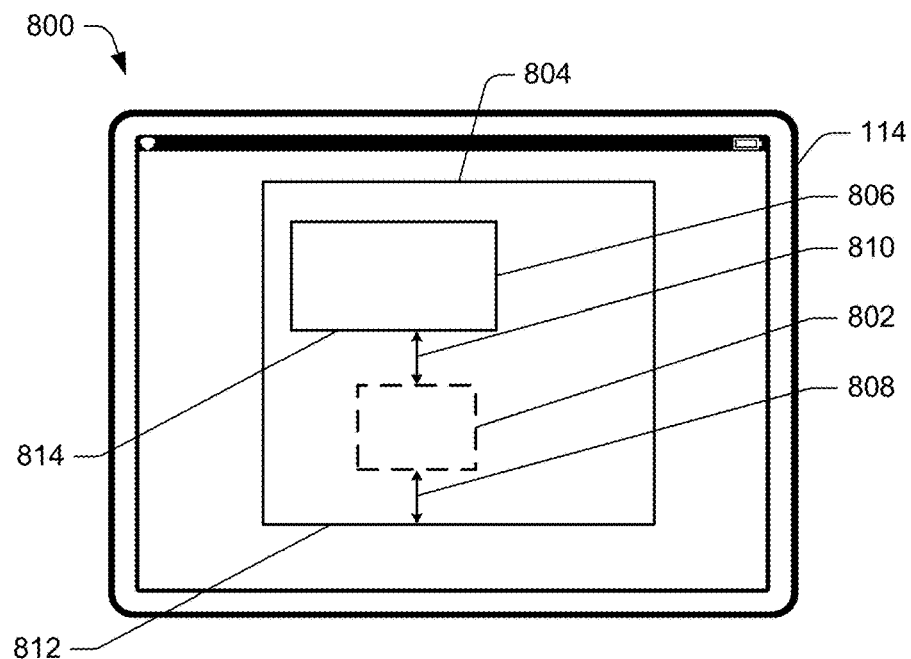

FIG. 8 illustrates another example 800 of displaying equal distance guides using the techniques discussed herein. In the example 800, a subject object bounding box 802 is displayed as contained within a reference object bounding box 804 on a display device 114. An additional reference object bounding box 806 is also contained within the reference object bounding box 804. Equal distance guides 808 and 810 indicate that the subject object bounding box 802 is equidistant from edge 812 of the reference object bounding box 804 and edge 814 of the reference object bounding box 806. Thus, as illustrated in example 800, equal distance guides can be displayed based on edges of reference object that contains both the subject object and an additional reference object.

Figure 9:
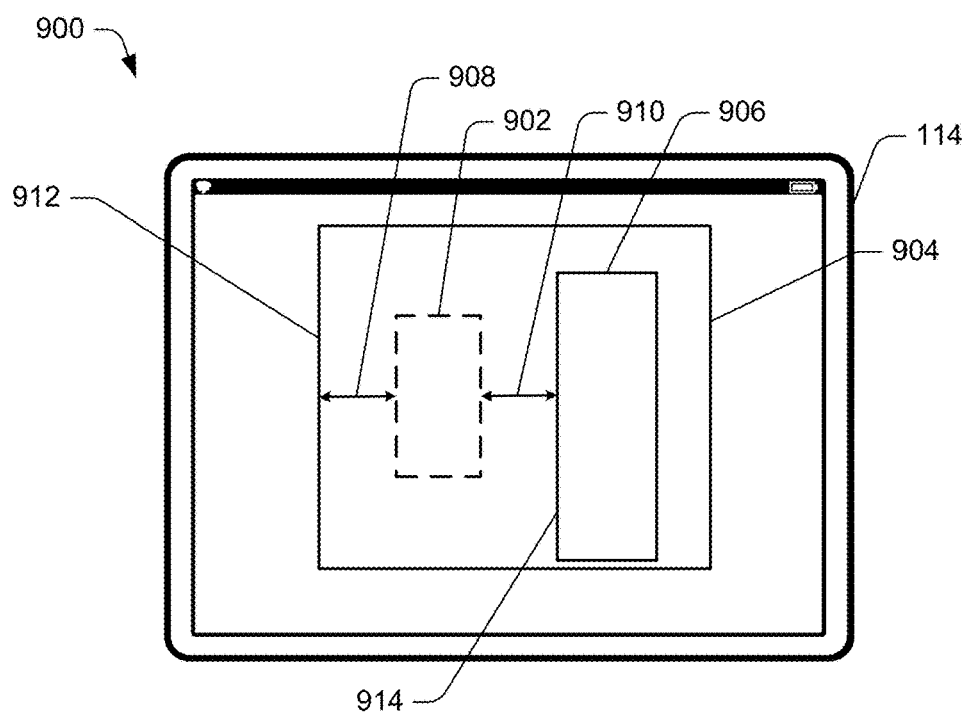

FIG. 9 illustrates another example 900 of displaying equal distance guides using the techniques discussed herein. In the example 900, a subject object bounding box 902 is displayed as contained within a reference object bounding box 904 on a display device 114. An additional reference object bounding box 906 is also contained within the reference object 904. Equal distance guides 908 and 910 indicate that the subject object bounding box 902 is equidistant from edge 912 of the reference object 904 and edge 914 of the reference object bounding box 906. Thus, as illustrated in example 900, equal distance guides can be displayed based on edges of reference object that contains both the subject object and an additional reference object.

Figure 10:
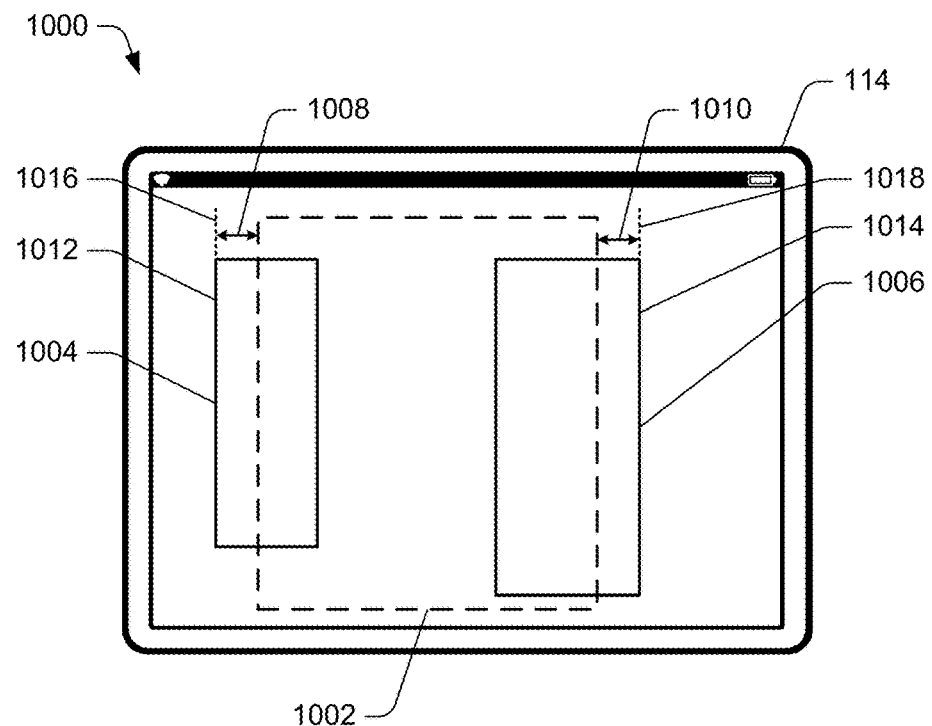

FIG. 10 illustrates another example 1000 of displaying equal distance guides using the techniques discussed herein. In the example 1000, a subject object bounding box 1002 is displayed on a display device 114 along with two reference objects bounding box 1004 and 1006 that each partially overlap the subject object bounding box 1002. Equal distance guides 1008 and 1010 are displayed to indicate that the subject object bounding box 1002 is equidistant from edge 1012 of the reference object bounding box 1004 and edge 1014 of the reference object 1006. Extension lines 1016 and 1018 are also displayed to facilitate viewing of the equal distance guides 1008 and 1010. Thus, as illustrated in example 1000, equal distance guides can be displayed based on edges of reference objects that partially overlap the subject object.

Referring back to FIG. 1, another example of displaying equal distance guides using the techniques discussed herein is described. In FIG. 1, a subject object 116 is displayed on a display device 114 along with two reference objects 118 and 120. The objects 116, 118, and 120 are rectangles, and thus their bounding boxes are the same as their shapes. The bounding box of the subject object 116 is contained within the bounding boxes of each of the reference objects 118 and 120, and the bounding boxes of the reference objects 118 and 120 partially overlap each other. Equal distance guides 122 and 124 are displayed to indicate that the bounding box of the subject object 116 is equidistant from an edge 142 of the bounding box of the reference object 118 and an edge 144 of the bounding box of the reference object 120. Thus, as illustrated in the example of FIG. 1, equal distance guides can be displayed based on edges of reference objects that partially overlap one another, and that both contain the subject object.

Figure 11:
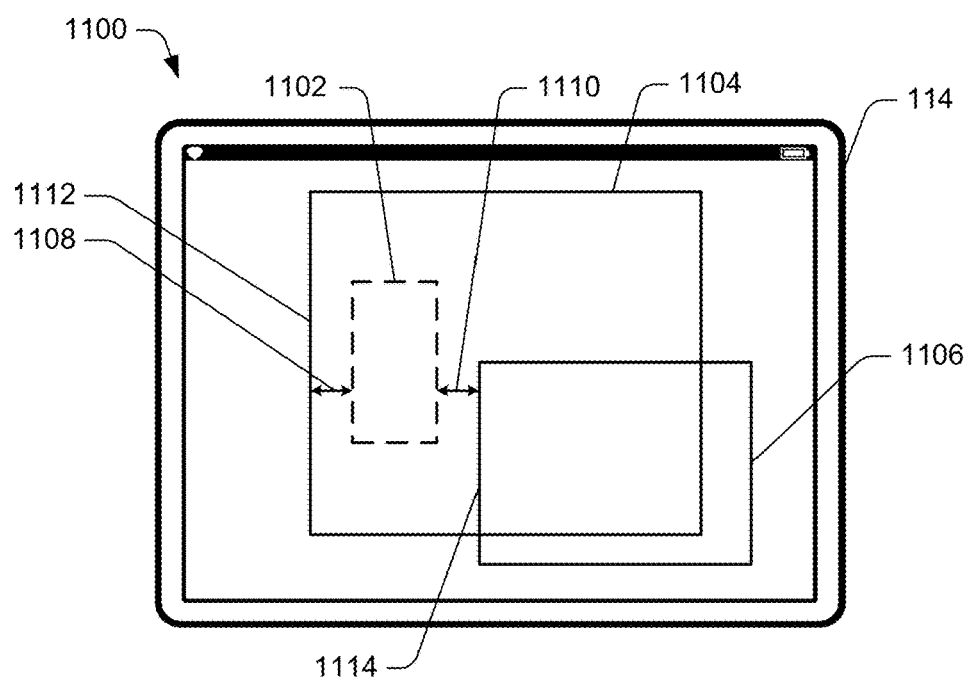

FIG. 11 illustrates another example 1100 of displaying equal distance guides using the techniques discussed herein. In the example 1100, a subject object bounding box 1102 is displayed on a display device 114 along with two reference objects bounding box 1104 and 1106. The subject object bounding box 1102 is contained within the reference object bounding box 1104. The subject object bounding box 1102 does not overlap the reference object bounding box 1106, but the reference object bounding box 1106 is within a region of interest of the subject object bounding box. The reference object bounding boxes 1104 and 1106 partially overlap each other. Equal distance guides 1108 and 1110 are displayed to indicate that the subject object bounding box 1102 is equidistant from edge 1112 of the reference object bounding box 1104 and edge 1114 of the reference object bounding box 1106. Thus, as illustrated in example 1100, equal distance guides can be displayed based on edges of reference objects that partially overlap one another but only one of which contains the subject object bounding box 1102.

Figure 12:
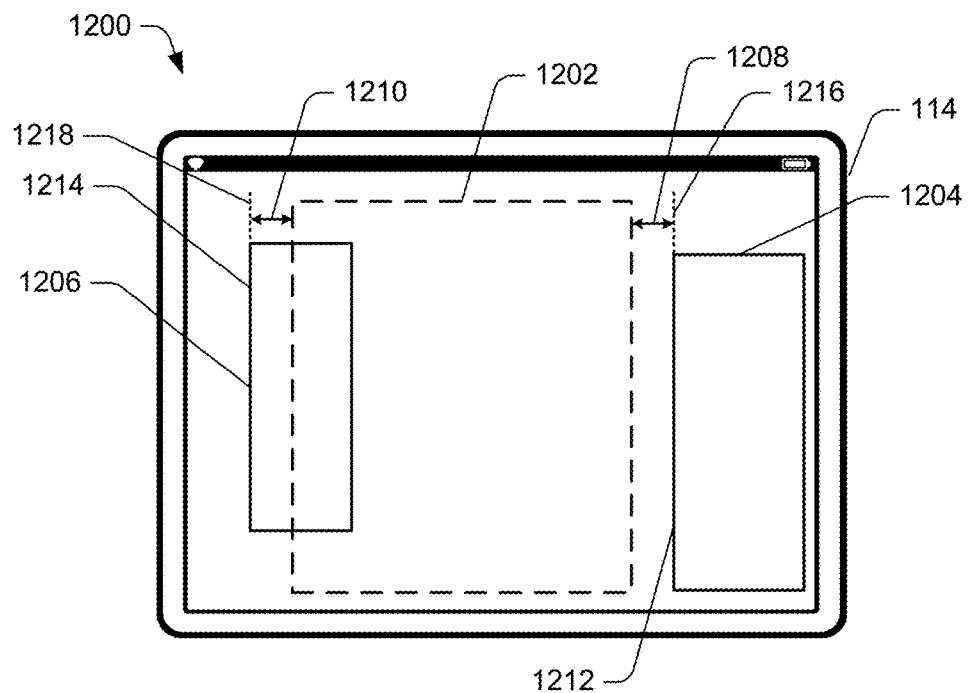

FIG. 12 illustrates another example 1200 of displaying equal distance guides using the techniques discussed herein. In the example 1200, a subject object bounding box 1202 is displayed on a display device 114 along with two reference object bounding boxes 1204 and 1206. The reference object bounding box 1206 partially overlaps the subject object bounding box 1202, but the reference object bounding box 1204 overlaps neither the subject object bounding box 1202 nor the reference object bounding box 1206. However, the reference object bounding box 1206 is within a region of interest of the subject object bounding box 1202. Equal distance guides 1208 and 1210 are displayed to indicate that the subject object bounding box 1202 is equidistant from edge 1212 of the reference object bounding box 1204 and edge 1214 of the reference object bounding box 1206. Extension lines 1216 and 1218 are also displayed to facilitate viewing of the equal distance guides 1208 and 1210. Thus, as illustrated in example 1200, equal distance guides can be displayed based on edges of one reference object bounding box that partially overlaps the subject object bounding box and another of that does not at least partially overlap the subject object bounding box.

Returning to FIG. 2, the sub-object generation module 132 is discussed as generating sub-objects from reference object bounding box edges. Additionally or alternatively, the 132 also generates sub-objects from rectilinear objects having a closed path. A rectilinear object refers to an object having a shape with all of its edges parallel to either the x-axis or the y-axis in the coordinate system. A closed path rectilinear object refers to a rectilinear object in which all anchor points (e.g., vertices) of the object are connected with each other and the path starts and ends at the same anchor point.

Some rectilinear objects, such as a rectangle, have a bounding box that is the same size as the object. Other rectilinear objects, such as a shape in the letter "E", have a bounding box that includes areas that are empty space, such as those areas between the prongs of the letter "E". Accordingly, conventional techniques that display smart guides based on bounding boxes are not able to display smart guides for edges of the rectilinear object that are within the bounding box.

The sub-object generation module 132 identifies reference objects in the reference object library 134 that are closed path rectilinear objects. These closed path rectilinear objects can have four or more edges, and can include one or more holes. From each such rectilinear object, the sub-object generation module 132 generates multiple sub-objects that are rectangles and adds the generated sub-objects to the set of reference objects in the reference object library 134. These sub-objects are then used by the smart guide determination module 136 when determining what smart guides to generate and have displayed. This allows the sub-object generation module 132 to display smart guides for edges of a rectilinear object that are within the bounding box of the rectilinear object.

Figure 13:
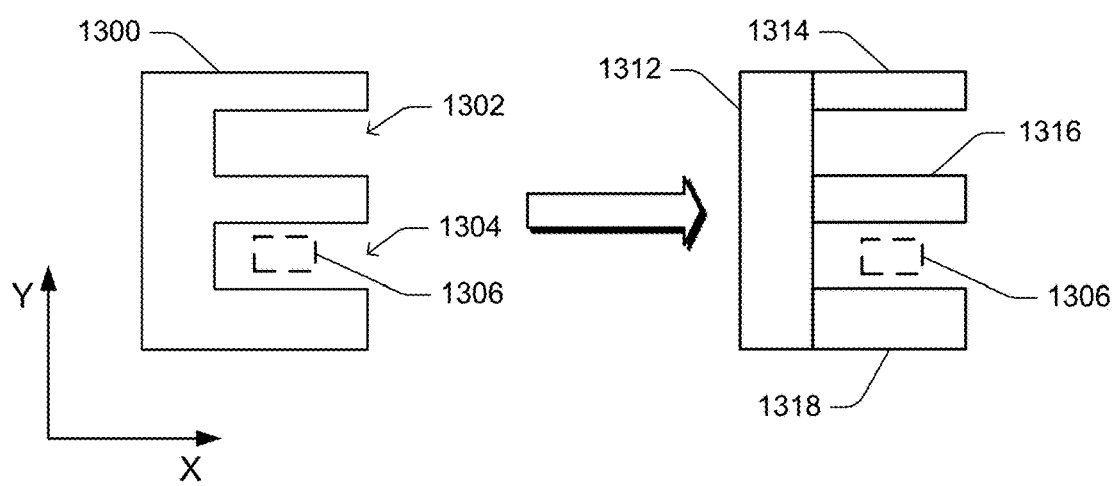
FIG. 13 illustrates an example of generating sub-objects from a rectilinear shape.

FIG. 13 illustrates an example of generating sub-objects from a rectilinear shape. A closed path rectilinear object 1300 in the shape of a letter "E" has a bounding box that is a rectangular area that contains all of the rectilinear object 1300, and includes the portions 1302 and 1304 between the prongs of the letter "E". Accordingly, conventional techniques that display smart guides based on bounding boxes are not able to display smart guides for subject objects within the bounding box of the rectilinear object 1300, and thus are not able to display smart guides for the subject object 1306 to the middle and lower prongs of the letter "E".

The sub-object generation module 132 generates multiple sub-objects that form the rectilinear object 1300. These sub-objects are rectangles and together these rectangles make up (cover the same locations in the digital content) the rectilinear object 1300. In the example of FIG. 13, the sub-object generation module 132 generates sub-objects 1312, 1314, 1316, and 1318 from the rectilinear object 1300. The smart guide determination module 136 uses these sub-objects 1312, 1314, 1316, and 1318 to generate smart guides and thus is able to display smart guides for portions of the rectilinear object 1300 that are within the bounding box of the rectilinear object 1300. Thus, using the techniques discussed herein, smart guides such as equal distance guides for the subject object 1306 are displayed even though the subject object 1306 is between two prongs of the letter "E".

Returning to FIG. 2, for each reference object the sub-object generation module 132 determines whether the reference object can be broken into multiple rectangular pieces. Rectilinear objects are made up of multiple path segments between anchor points (e.g., vertices). The sub-object generation module 132 maintains a database or record of the objects in the digital content and the path segments that make up those objects. This database or record can be maintained, for example, as part of the reference object library 134.

The sub-object generation module 132 determines that a reference object can be broken into multiple rectangular pieces if the reference object has at least four path segments and if the reference object is a rectilinear object. The sub-object generation module 132 does not extract rectangular sub-objects from reference objects that do not satisfy these criteria (i.e., that do not have at least four path segments and are not rectilinear objects).

The sub-object generation module 132 generates sub-objects from a reference object by breaking the reference object into multiple rectangles. In one or more implementations, the sub-object generation module 132 attempts to break the reference object into the minimum number of rectangles that do not overlap (although may share edges) and that together make up (cover the same locations in the digital content as) the reference object. The sub-object generation module 132 can break a reference object into multiple rectangles using any of a variety of different public and/or proprietary techniques.

In accordance with one or more implementations, the sub-object generation module 132 breaks a reference object into multiple rectangles using a graph-based decomposition approach. In a rectilinear object, each vertex of the rectilinear object can be a convex vertex (a vertex having an internal angle of 90 degrees) or a concave vertex (a vertex having an internal angle of 270 degrees). The sub-object generation module 132 identifies all concave vertices of the reference object. From these concave vertices, the sub-object generation module 132 identifies pairs of co-grid concave vertices. These pairs of co-grid concave vertices are connected by chords that are horizontal or vertical. Chords are selected that do not intersect and that form a bipartite graph having a threshold maximum independent set of nodes (e.g., a maximum independent set of 3 nodes). The selected chords are used to identify sub-polygons of the rectilinear object. The chords are horizontal or vertical, so each sub-polygon of the rectilinear object is also a rectilinear shape. For each sub-polygon that is a rectangle, the sub-polygon is treated as a sub-object and is added to the reference object library 134. This process is repeated for each sub-polygon that is not a rectangle, being performed iteratively on each sub-polygon until all sub-polygons are rectangles.

Figure 14A:
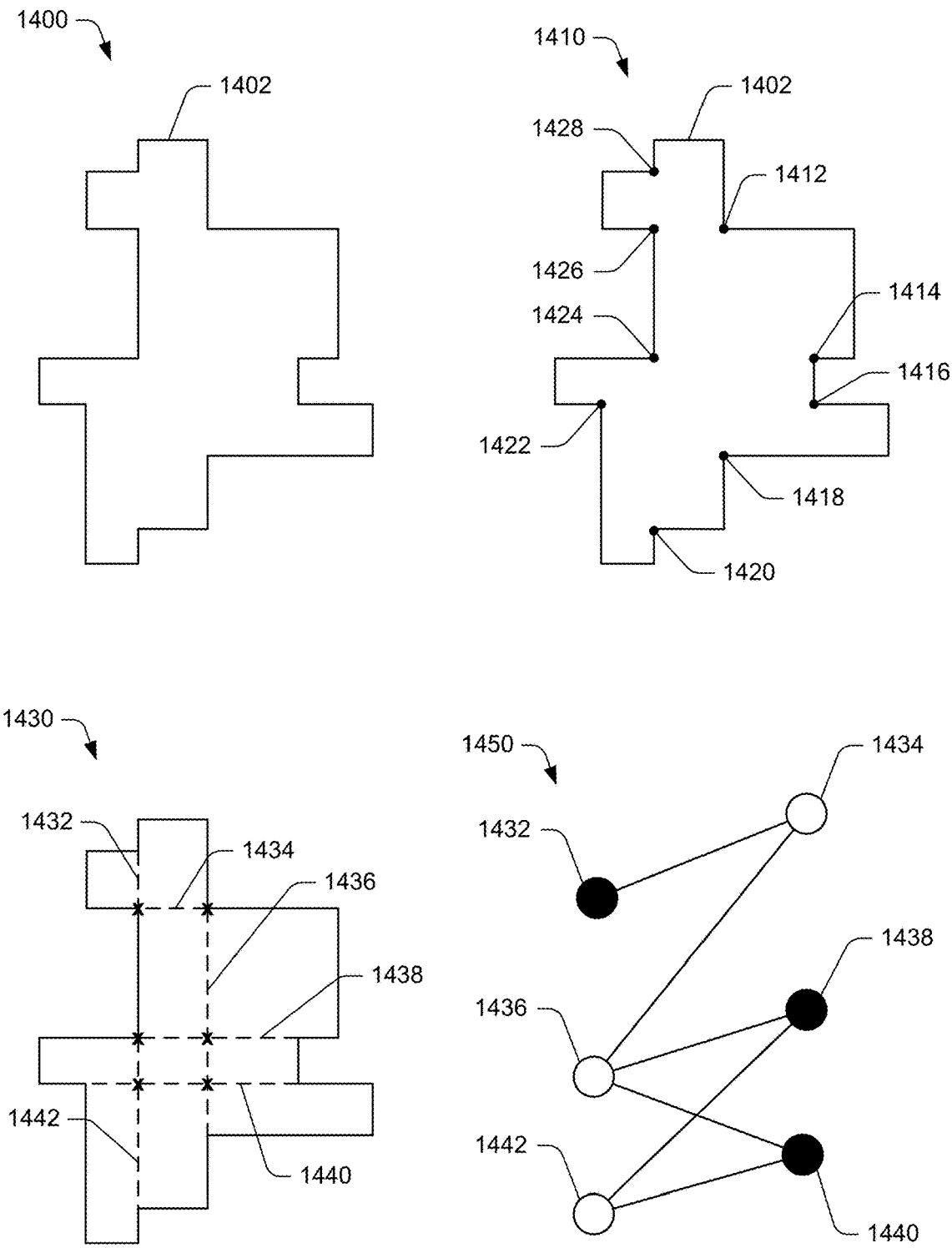
FIGS. 14A and 14B illustrate an example process of breaking a reference object into multiple rectangles using a graph-based decomposition approach.
Figure 14B:
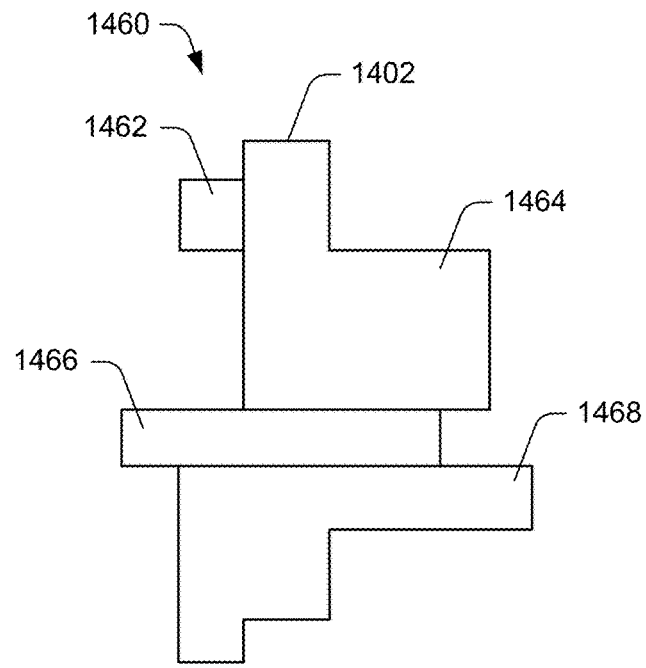
Figure 14B:
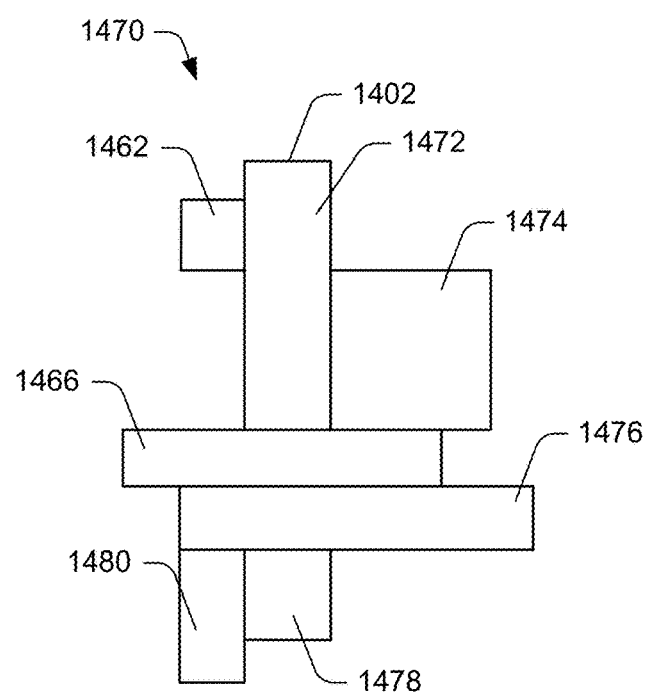

FIGS. 14A and 14B illustrate an example process of breaking a reference object into multiple rectangles using a graph-based decomposition approach. At 1400 a reference object 1402 that is a rectilinear object is shown. As shown at 1410, the reference object 1402 includes concave vertices 1412, 1414, 1416, 1418, 1420, 1422, 1424, 1426, and 1428.

At 1430, the possible chords connecting the co-grid concave vertices are illustrated as dashed lines. These are chords 1432, 1434, 1436, 1438, 1440, and 1442. Locations where ones of the chords 1432-1442 intersect another chord 1432-1442 are illustrated with an "x". Chords that do not intersect are selected, and in the illustrated example chords 1432, 1438, and 1440 are selected.

At 1450, a bipartite graph corresponding to the chords 1432-1442 is illustrated. The bipartite graph includes two independent sets. One set is a set of horizontal chords 1434, 1438, and 1440, and the other set is a set of vertical chords 1432, 1436, and 1442.

At 1460, the first-level decomposition of the reference object 1402 is illustrated. In the first-level decomposition the reference object 1402 is broken into four sub-polygons 1462, 1464, 1466, and 1468. Sub-polygons 1462 and 1466 are each rectangles and thus each is treated as a sub-object and is added to the reference object library 134. Sub-polygons 1464 and 1468 are not rectangles and thus this process of breaking an object into sub-polygons is repeated for each of sub-polygons 1464 and 1468.

At 1470, the final breaking down of the reference object 1402 into rectangles is shown. As illustrated, the reference object 1402 is broken down into sub-polygons 1462, 1466, 1472, 1474, 1476, 1478, and 1480, each of which is a rectangle and thus is treated as a sub-object and is added to the reference object library 134.

Returning to FIG. 2, the smart guide determination module 136 calculates the distance between the subject object and the closest candidate reference object in each direction, which is also referred to as the gap distance. These distances are based on the bounding box edges of the subject object and the closest candidate reference objects in each direction.

For example, the closest candidate reference object to the left of the subject object is the candidate reference object having a right bounding box edge closest to the left bounding box edge of the subject object. These candidate reference objects can be sub-objects generated from an edge of a reference object bounding box as discussed above, another reference object that does not have a bounding box that at least partially overlaps the subject object bounding box or a region of interest for the subject object bounding box, or a sub-object that is a rectangle of a rectilinear object. Given these distances, the smart guide determination module 136 determines whether the distances in the same dimension but opposite directions are approximately equal. Two distances being approximately equal refers to the two distances being the same or within a threshold amount (e.g., 95% or 99%) of one another. In response to determining that the two distances are approximately equal, the smart guide determination module 136 notifies the smart guide display module 138 to display equal distance guides. The equal distance guides are one or more lines, arrows, or other indicators that the subject object is approximately equidistant from the two nearest candidate reference objects in opposite directions of the same dimension. The equal distance guides can take any of a variety of different forms as discussed above, and can optionally include extension lines.

Figure 15:
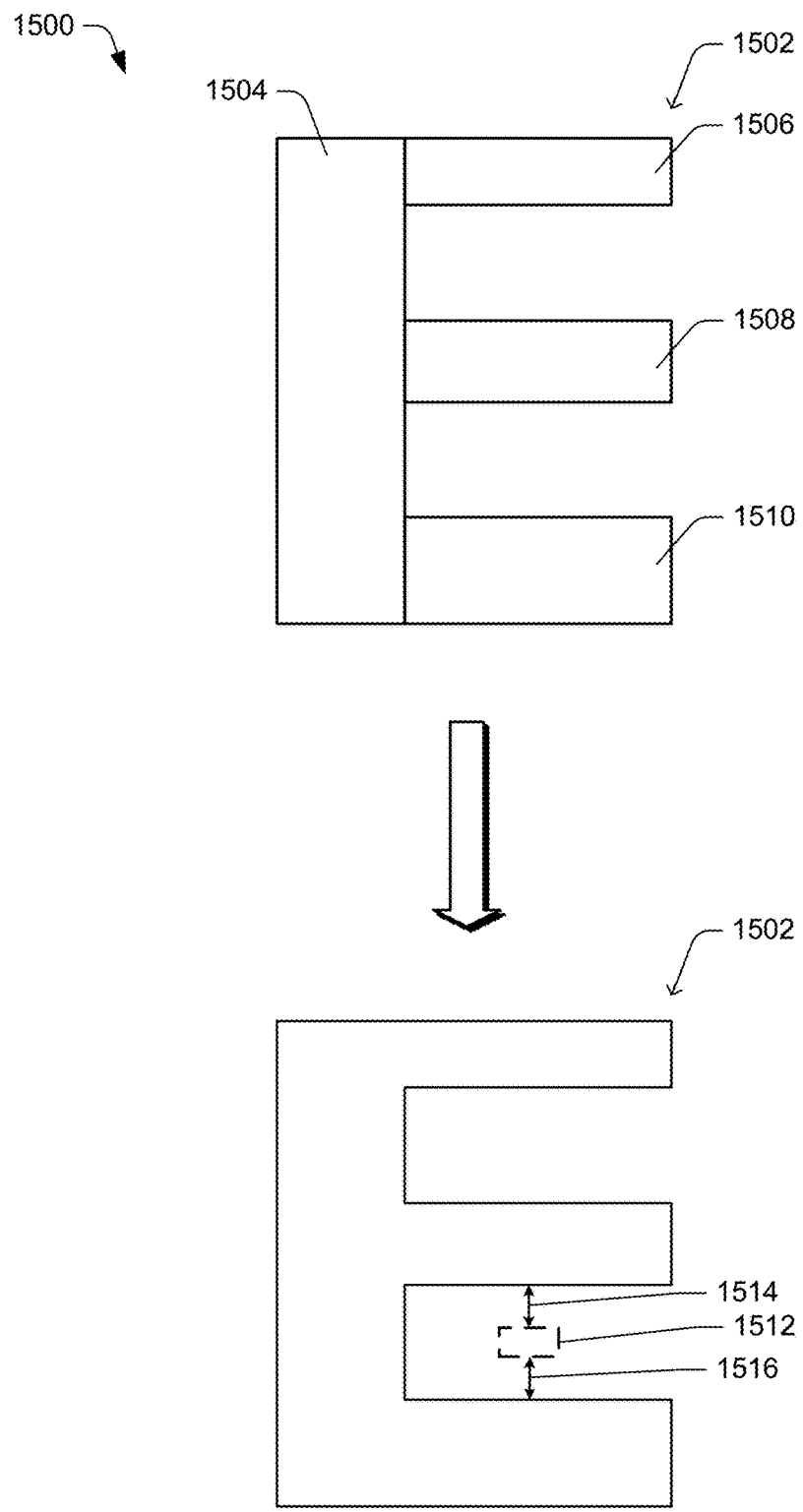
FIGS. 15, 16, 17, and 18 illustrate examples of displaying equal distance guides using the techniques discussed herein.

FIG. 15 illustrates an example 1500 of displaying equal distance guides using the techniques discussed herein. In the example 1500, a reference object 1502 that is a rectilinear object has been broken into multiple sub-objects 1504, 1506, 1508, and 1510 that are rectangles. Each of these sub-objects 1504, 1506, 1508, and 1510 is added to the reference object library 134. A subject object 1512 is displayed as positioned between sub-objects 1508 and 1510. Equal distance guides 1514 and 1516 indicate that the subject object 1512 is equidistant from sub-objects 1508 and 1510. Although the sub-objects 1504, 1506, 1508, and 1510 are generated, these sub-objects being different rectangles that together make up the reference object 1502 need not be (and typically are not) displayed separately from the reference object 1502—only the reference object 1502 is displayed. The user need have no knowledge that these sub-objects 1504, 1506, 1508, and 1510 have been generated. Thus, as illustrated in example 1500, equal distance guides can be displayed between two portions of a reference object regardless of the location of the bounding box of the reference object.

Figure 16:
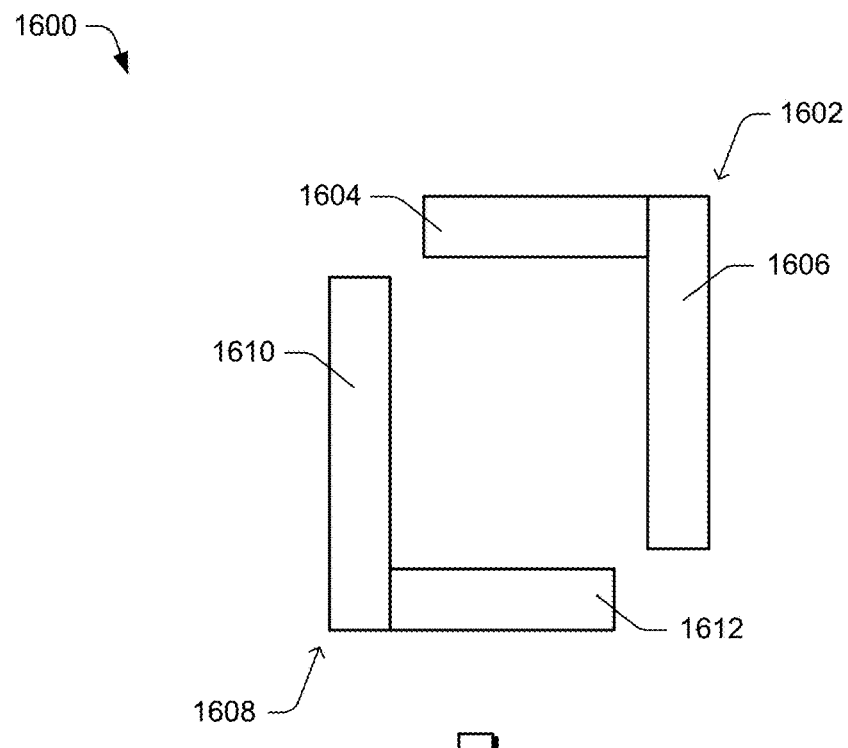
Figure 16:
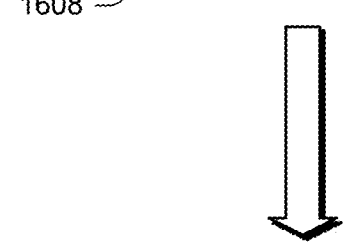
Figure 16:
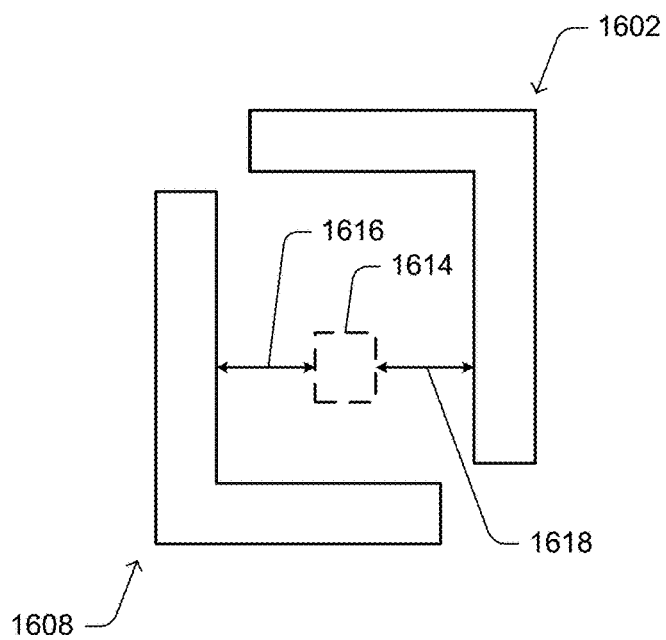

FIG. 16 illustrates an example 1600 of displaying equal distance guides using the techniques discussed herein. In the example 1600, a reference object 1602 is shown broken into multiple sub-objects 1604 and 1606 that are rectangles. Also, a reference object 1608 is shown broken into multiple sub-objects 1610 and 1612 that are rectangles. Each of these sub-objects 1604, 1606, 1610, and 1612 is added to the reference object library 134. A subject object 1614 is displayed as positioned between sub-objects 1606 and 1610, as well as between sub-objects 1604 and 1612. Equal distance guides 1616 and 1618 indicate that the subject object 1614 is equidistant from sub-objects 1606 and 1610. Although the sub-objects 1604, 1606, 1610, and 1612 are generated, these sub-objects being different rectangles that together make up the reference objects 1602 and 1608 need not be (and typically are not) displayed separately from the reference objects 1602 and 1608—only the reference objects 1602 and 1608 displayed. The user need have no knowledge that these sub-objects 1604, 1606, 1610, and 1612 have been generated. Thus, as illustrated in example 1600, equal distance guides can be displayed between two portions of two different reference objects regardless of the locations of the bounding boxes of those two reference objects.

Figure 17:
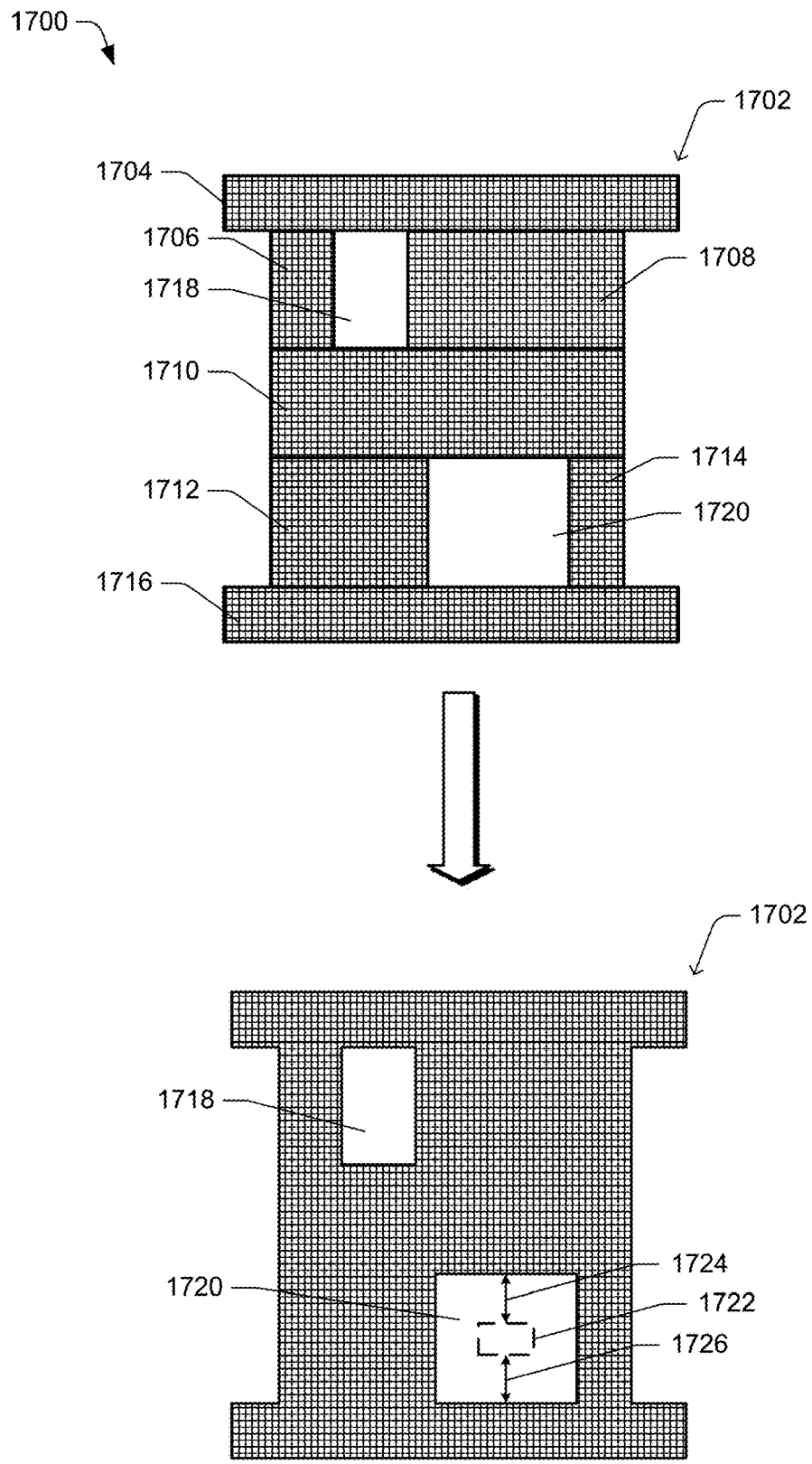

FIG. 17 illustrates an example 1700 of displaying equal distance guides using the techniques discussed herein. In the example 1700, a reference object 1702 is shown broken into multiple sub-objects 1704, 1706, 1708, 1710, 1712, 1714, and 1716 that are rectangles. There are also two rectangular holes 1718 and 1720 in the reference object 1702. Each of these sub-objects 1704, 1706, 1708, 1710, 1712, 1714, and 1716 is added to the reference object library 134. A subject object 1722 is displayed as positioned in the hole 1720. Equal distance guides 1724 and 1726 indicate that the subject object 1722 is equidistant from the edges of the hole 1720 (which is between sub-objects 1710 and 1716). Although the sub-objects 1704, 1706, 1708, 1710, 1712, 1714, and 1716 are generated, these sub-objects being different rectangles that together make up the reference object 1702 need not be (and typically are not) displayed separately from the reference object 1702—only the reference object 1702 is displayed. The user need have no knowledge that these sub-objects 1704, 1706, 1708, 1710, 1712, 1714, and 1716 have been generated. Thus, as illustrated in example 1700, equal distance guides can be displayed between two portions of a reference object regardless of the location of the bounding box of the reference object.

Returning to FIG. 2, once the sub-object generation module 132 has generated the sub-objects for a rectilinear object, the sub-object generation module 132 maintains a database or record of the sub-objects that make up the rectilinear object. Thus, the sub-object generation module 132 need not repeatedly generate sub-objects for a rectilinear object. This database or record can be maintained, for example, as part of the reference object library 134. The sub-object generation module 132 uses this database or record of the sub-objects that make up the rectilinear object when the rectilinear object is being transformed in some manner by the user, such as being scaled, stretched, rotated, and so forth. The sub-object generation module 132 also uses this database or record of the sub-objects that make up the rectilinear object when the rectilinear object is moved to a different location in the digital content.

In one or more implementations, the sub-object generation module 132 maintains a transformation matrix for each rectilinear object that is transformed in some manner by the user after the sub-object generation module 132 has broken the rectilinear object into multiple sub-objects. In response to a subsequent user request to transform the rectilinear object, the sub-object generation module 132 generates a transformation matrix that indicates what changes were made to the rectilinear object. This transformation matrix can indicate, for example, that the rectilinear object has been rotated a particular angle, has increased in size by a particular factor, has decreased in size by a particular factor, and so forth. The sub-object generation module 132 applies this transformation matrix to each sub-object that makes up the rectilinear object. Accordingly, the sub-object generation module 132 need not re-generate the sub-objects for each rectilinear object that is transformed, but can simply apply the transformation matrix to each such sub-object.

Similarly, the sub-object generation module 132 maintains a translation matrix for each rectilinear object that is moved to a different location in the digital content after the sub-object generation module 132 has broken the rectilinear object into multiple sub-objects. In response to a subsequent user request to move the rectilinear object, the sub-object generation module 132 generates a translation matrix that indicates how the rectilinear object was moved. This translation matrix can indicate, for example, that the rectilinear object has been moved a particular distance in a particular direction. The sub-object generation module 132 applies this translation matrix to each sub-object that makes up the rectilinear object. Accordingly, the sub-object generation module 132 need not re-generate the sub-objects for each rectilinear object that is moved, but can simply apply the translation matrix to each such sub-object.

It should be noted that the techniques discussed herein for displaying equal distance guides when a reference object bounding box at least partially overlaps a region of interest of a subject object bounding box, and generating multiple rectangle sub-objects from rectilinear objects can be combined and implemented together. For example, the sub-object generation module 132 can break a rectilinear object into multiple sub-objects that are rectangles, and then generate sub-objects from edges of the generated rectangle sub-objects. As the generated sub-objects are rectangles, the bounding boxes of the generated sub-objects will be the same size as the sub-objects themselves.

Figure 18:
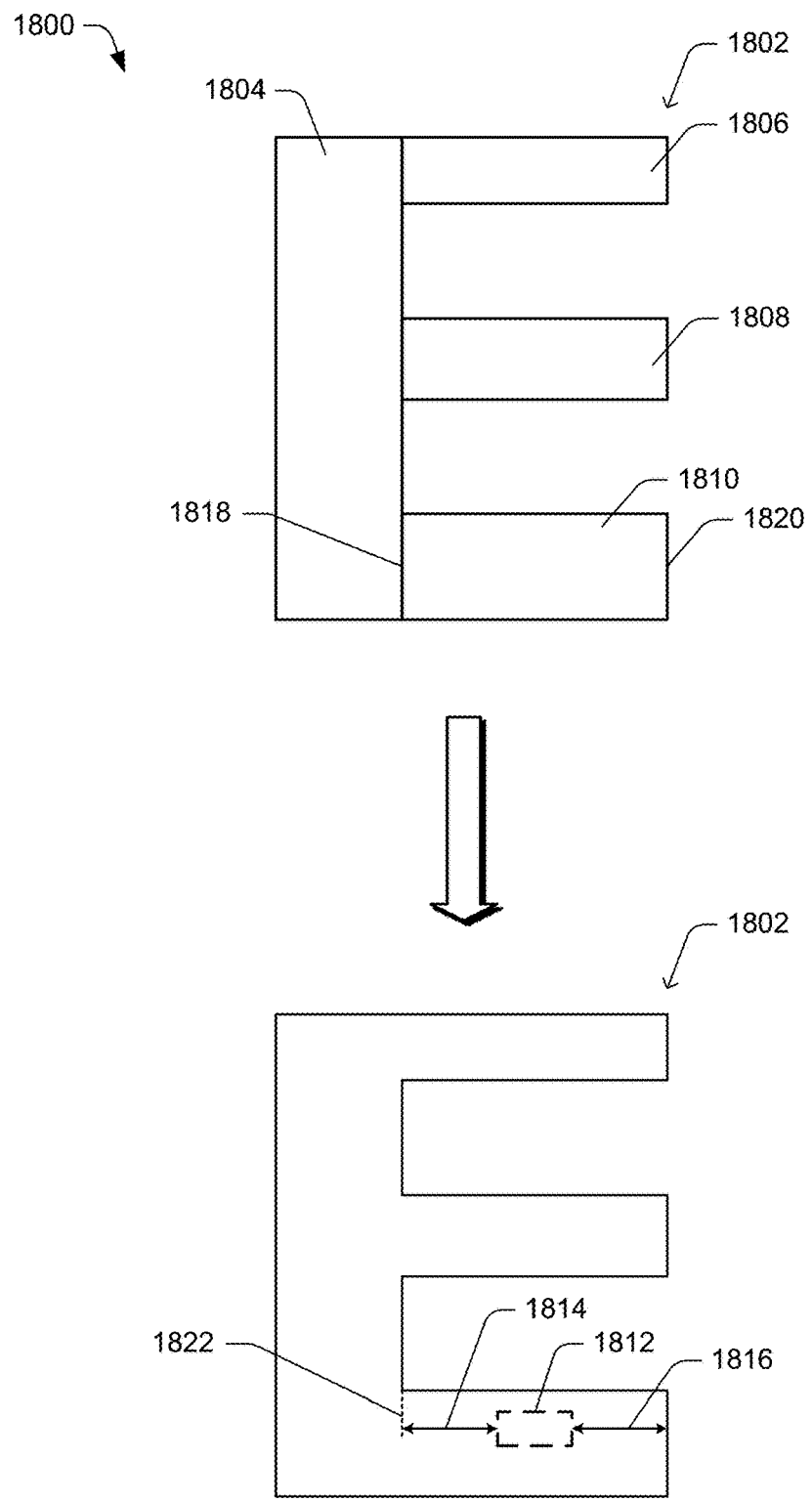

FIG. 18 illustrates an example 1800 of displaying equal distance guides using the techniques discussed herein. In the example 1800, a reference object 1802 is shown broken into multiple sub-objects 1804, 1806, 1808, and 1810 that are rectangles. Each of these sub-objects 1804, 1806, 1808, and 1810 is added to the reference object library 134. A subject object 1812 is displayed as positioned within sub-object 1810. Equal distance guides 1814 and 1816 indicate that the bounding box of the subject object 1812 is equidistant from the edges 1818 and 1820 of the bounding box of the sub-object 1810. An extension line 1822 is also displayed to facilitate viewing of the equal distance guide 1814. Although the sub-objects 1804, 1806, 1808, and 1810 are generated, these sub-objects being different rectangles that together make up the reference object 1802 need not be (and typically are not) displayed separately from the reference object 1802—only the reference object 1802 is displayed. Thus, the edge 1818 of the sub-object 1810 is not displayed. The user need have no knowledge that these sub-objects 1804, 1806, 1808, and 1810 have been generated. Thus, as illustrated in example 1800, equal distance guides can be displayed between two portions of a reference object regardless of the location of the bounding box of the reference object.

Examples of the smart guide determination module 136 generating equal distance guides between a subject object and reference objects in the set of reference objects are discussed above. Additionally or alternatively, the smart guide determination module 136 can generate other types of smart guides, such as alignment guides. Alignment guides are lines, arrows, or other indicators of when an edge of a subject object, or the subject object itself, is aligned with an edge of reference object, or the reference object itself, along either the x-axis or the y-axis in the coordinate system. This alignment can be based on the edges of a subject object bounding box and the edges of a reference object bounding box. As discussed above, conventional techniques display smart guides based on the bounding boxes of reference objects. In contrast, as a result of the sub-object generation module 132 generating rectangle sub-objects from rectilinear objects, the smart guide determination module 136 can display alignment guides based on the individual sub-objects of the rectilinear object rather than the bounding box of the rectilinear object.

In one or more implementations, to display alignment guides, the smart guide determination module 136 determines when an edge of the subject object bounding box and an edge of a reference object bounding box are approximately aligned along either the x-axis or the y-axis in the coordinate system. For example, an edge of the subject object bounding box and an edge of a reference object bounding box are approximately horizontally aligned if the value of the y coordinate of the edge of the subject object bounding box is approximately equal to the value of the y coordinate of the edge of the reference object bounding box, and an edge of the subject object bounding box and an edge of a reference object bounding box are approximately vertically aligned if the value of the x coordinate of the edge of the subject object bounding box is approximately equal to the value of the x coordinate of the edge of the reference object bounding box. Two values are approximately equal if the two values are the same or within a threshold amount (e.g., 95% or 99%) of one another. In response to determining that an edge of the subject object bounding box and an edge of a reference object bounding box are approximately horizontally or vertically aligned, the smart guide determination module 136 notifies the smart guide display module 138 to display an alignment guide.

Figure 19:
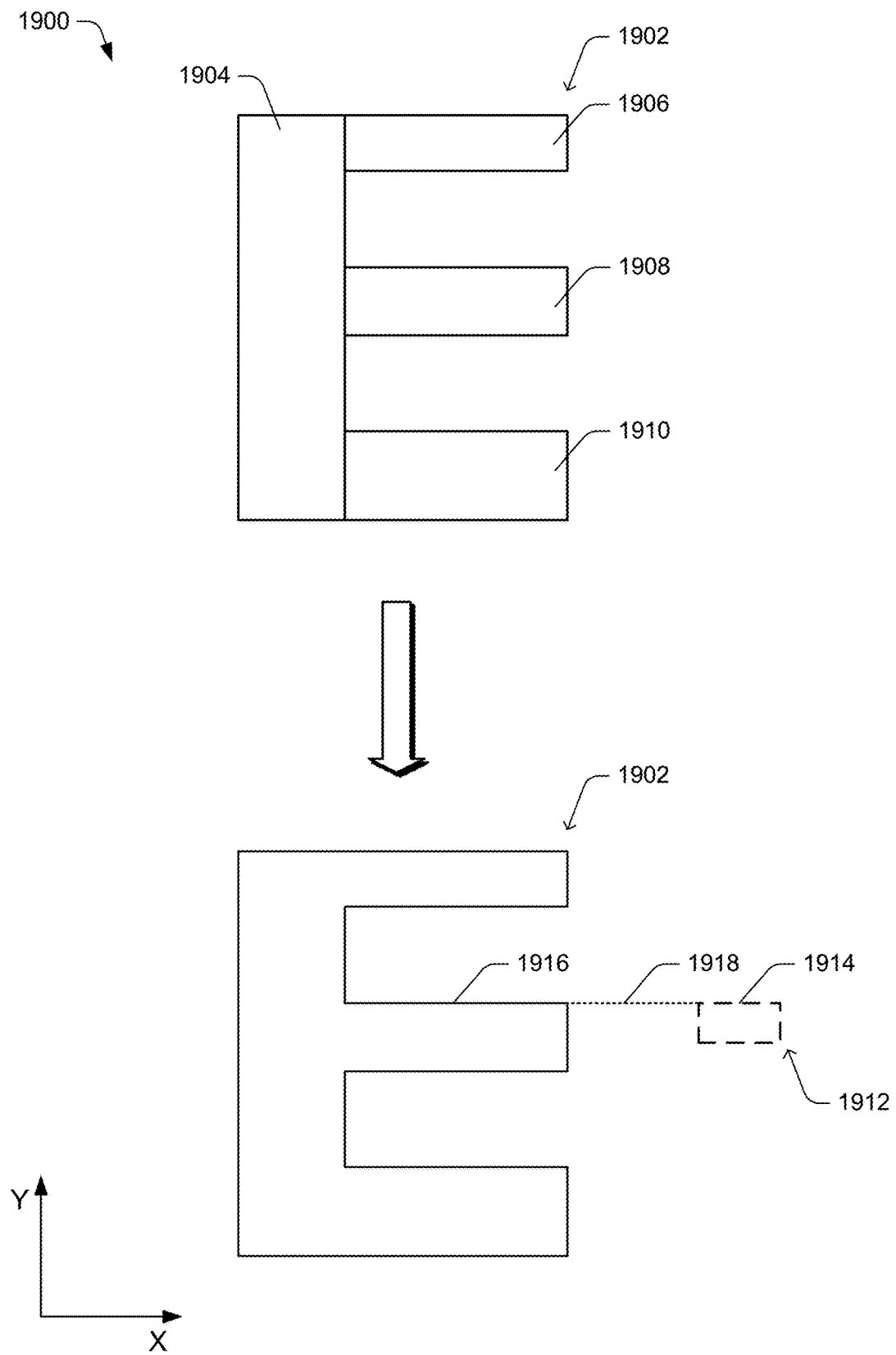
FIGS. 19 and 20 illustrate examples of displaying alignment guides using the techniques discussed herein.

FIG. 19 illustrates an example 1900 of displaying alignment guides using the techniques discussed herein. In the example 1900, the reference object 1902 is shown broken into multiple sub-objects 1904, 1906, 1908, and 1910 that are rectangles. Each of these sub-objects 1904, 1906, 1908, and 1910 is added to the reference object library 134. A subject object 1912 is displayed as positioned to the right of the reference object 1902 and with the top edge 1914 of the subject object 1912 bounding box being horizontally aligned with the top edge 1916 of the sub-object 1908 bounding box. An alignment guide 1918 indicates that the top edge 1914 of the subject object 1912 bounding box is horizontally aligned with the top edge 1916 of the sub-object 1908 bounding box. Although the sub-objects 1904, 1906, 1908, and 1910 are generated, these sub-objects being different rectangles that together make up the reference object 1902 need not be (and typically are not) displayed separately from the reference object 1902—only the reference object 1902 is displayed. The user need have no knowledge that these sub-objects 1904, 1906, 1908, and 1910 have been generated. Thus, as illustrated in example 1900, an alignment guide can be displayed between a subject object and a reference object regardless of the location of the bounding box of the reference object.

Figure 20:
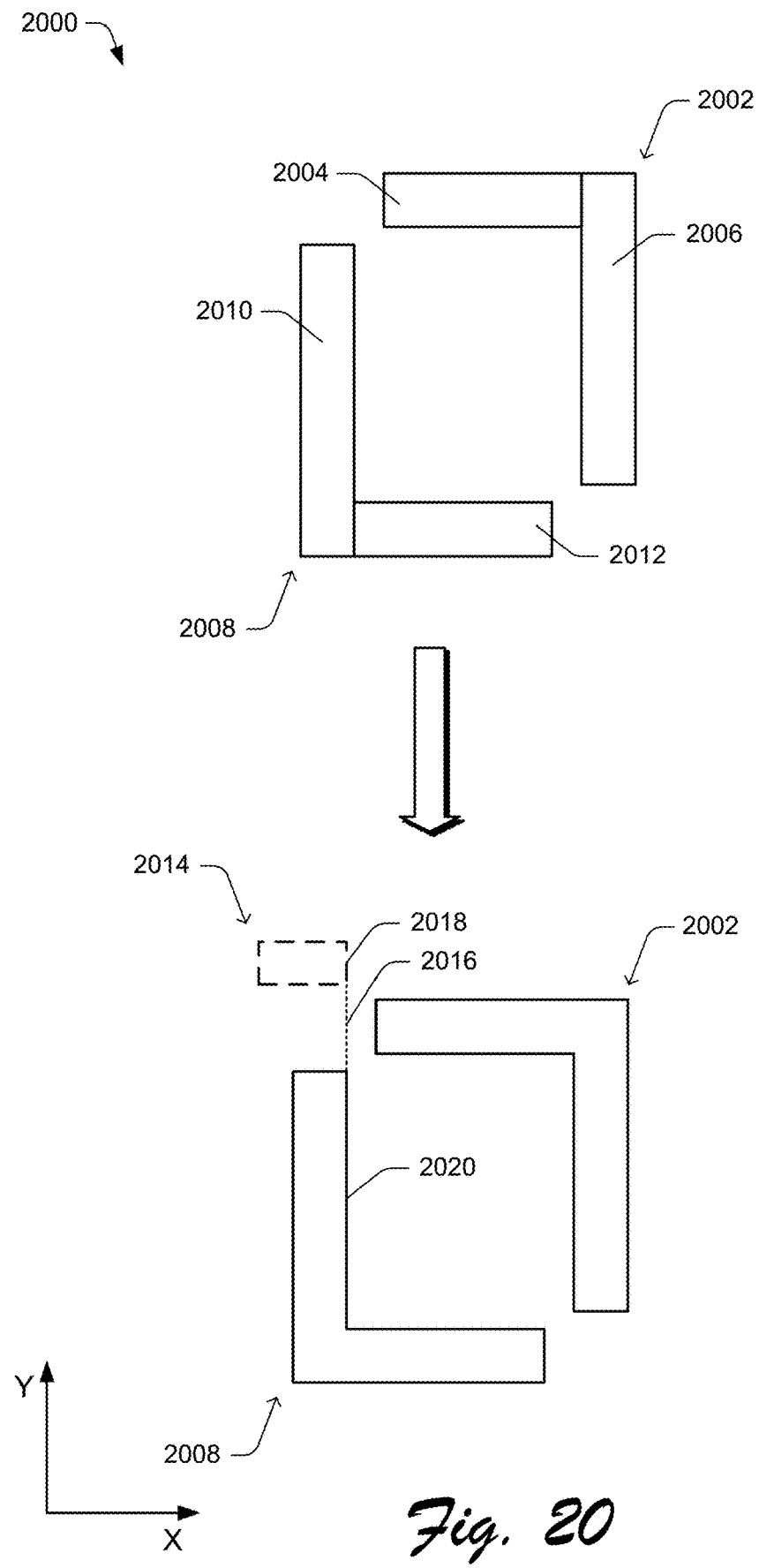

FIG. 20 illustrates an example 2000 of displaying alignment guides using the techniques discussed herein. In the example 2000, a reference object 2002 is shown broken into multiple sub-objects 2004 and 2006 that are rectangles. Also, a reference object 2008 is shown broken into multiple sub-objects 2010 and 2012 that are rectangles. Each of these sub-objects 2004, 2006, 2010, and 2012 is added to the reference object library 134. A subject object 2014 bounding box is displayed as positioned above the reference object 2008. An alignment guide 2016 indicates that the right edge 2018 of the subject object 2014 bounding box is vertically aligned with the right edge 2020 of the sub-object 2008 bounding box. Although the sub-objects 2004, 2006, 2010, and 2012 are generated, these sub-objects being different rectangles that together make up the reference objects 2002 and 2008 need not be (and typically are not) displayed separately from the reference objects 2002 and 2008—only the reference objects 2002 and 2008 displayed. The user need have no knowledge that these sub-objects 2004, 2006, 2010, and 2012 have been generated. Thus, as illustrated in example 2000, an alignment guide can be displayed between a subject object and a reference object regardless of the location of the bounding box of the reference object.

The snapping module 140 implements functionality to snap a subject object to a particular location that is horizontally or vertically aligned with a reference object in response to the subject object not being horizontally or vertically aligned with a reference object but being within a threshold amount of being horizontally or vertically aligned with the reference object. Snapping the subject object to a particular location that is horizontally or vertically aligned with a reference object refers to moving or changing the location of the subject object in a direction perpendicular to the direction of the alignment. For example, if an edge of the subject object bounding box is within a threshold distance of being vertically aligned with an edge of a reference object bounding box, then the subject object is moved to the left or right (but not up or down) so that the subject object bounding box is vertically aligned with the reference object bounding box (e.g., so that their x coordinate values are the same). By way of another example, if an edge of the subject object bounding box is within a threshold distance of being horizontally aligned with an edge of a reference object bounding box, then the subject object is moved up or down (but not to the left or right) so that the subject object bounding box is horizontally aligned with the reference object bounding box (e.g., so that their y coordinate values are the same). Thus, in addition to displaying an alignment guide between the edge of the subject object bounding box and the edge of the reference object bounding box, the subject object can also be snapped to a location that is horizontally or vertically aligned with the reference object.

Returning to FIG. 1, the digital content creation system 104 supports freeform gradients that allow a user to position freeform gradient color points anywhere they desire within a reference object and set a color value for each of those freeform gradient color points. A freeform gradient color point is a point (e.g., a location of a single pixel) within a reference object that has a color value that can be set by the user. The digital content creation system 104 smoothly diffuses the color values from these various color points with each other inside the reference object to provide a smooth shading experience to the user. These freeform gradient color points are the actual sources of color that extends out from each freeform gradient color point and that is smoothly diffused with the color that extends out from the other freeform gradient color points inside the reference object. The freeform gradient color points let the user define the gradients across the geometry of a reference object.

The user is able to place freeform gradient color points at the locations he or she desires in a reference object and assign to each freeform gradient color point the color value that he or she desires. The sub-object generation module 132 iterates over reference objects that have a freeform gradient applied to them, and for each such reference object the sub-object generation module 132 identifies the freeform gradient color points from the reference object. The sub-object generation module 132 generates sub-objects that are the freeform gradient color points within a reference object. These freeform gradient color points can be present as standalone points in the reference object or points along one or more color curves in the object. The sub-objects that are freeform gradient color points of a reference object are added to the reference object library 134 as reference objects.

A database or record of the freeform gradient color points in a reference object is maintained by the digital content creation system 104. This database or record can be maintained, for example, as part of the reference object library 134. For example, a list of freeform gradient color points in a reference object can be maintained as metadata associated with the reference object. The sub-object generation module 132 can identify the freeform gradient color points in any of a variety of different manners, such as by accessing this database or record of the freeform gradient color points.

Once the freeform gradient color points have been added to the reference object library 134 as reference objects, the smart guide determination module 136 uses the freeform gradient color points to display smart guides. These smart guides include alignment guides and equal distance guides. Providing alignment guides helps the user place a subject object (e.g., another freeform gradient color point or another object) horizontally or vertically aligned with the color points present in the reference object. Providing equal distance guides helps the user place a subject object (e.g., another freeform gradient color point or another object) equidistant between two other freeform gradient color points.

To display alignment guides and equal distance guides for reference objects that are freeform gradient color points, in one or more implementations the reference objects that are freeform gradient color points are a single location (e.g., a location of a pixel) having a particular (x,y) coordinate in a 2-dimensional Cartesian coordinate system. Additionally or alternatively, the reference objects that are freeform gradient color points can be circles (or some other geometric shape) that cover multiple locations (e.g., multiple pixels). In situations in which the reference objects are freeform gradient color points having a geometric shape that includes multiple points, a single point included in the geometric shape is selected and used as the point to display smart guides. This single point can be, for example, the center of a circle, the topmost point of the circle, the leftmost point of the circle, and so forth.

In situations in which the subject object and the reference objects are freeform gradient color points, the smart guide determination module 136 displays alignment guides by determining when the subject object and a reference object are aligned along either the x-axis or the y-axis in the coordinate system. For example, the subject object and a reference object are horizontally aligned if the value of the y coordinate of the subject object is approximately equal to the value of the y coordinate of the reference object, and the subject object and a reference object are vertically aligned if the value of the x coordinate of the subject object is approximately equal to the value of the x coordinate of the reference object. Two values are approximately equal if the two values are the same or within a threshold amount (e.g., 95% or 99%) of one another. In response to determining that the subject object and a reference object are horizontally or vertically aligned, the smart guide determination module 136 notifies the smart guide display module 138 to display an alignment guide.

In situations in which the subject object and the reference objects are freeform gradient color points, the smart guide determination module 136 displays equal distance guides by calculating the distance between the subject object and the closest candidate reference object in each of multiple directions in the same dimension (e.g., left and right along the x-axis, up and down along the y-axis), which is also referred to as the gap distance as discussed above. Given these distances, the smart guide determination module 136 determines whether the distances in the same dimension but opposite directions are approximately equal given the (x,y) locations of the subject object and the candidate reference objects. Two distances being approximately equal refers to the two distances being the same or within a threshold amount (e.g., 95% or 99%) of one another. In response to determining that the two distances are approximately equal, the smart guide determination module 136 notifies the smart guide display module 138 to display equal distance guides.

For example, if the smart guide determination module 136 determines that the distance between the subject object and the nearest candidate reference object in the left direction from the subject object is approximately equal to the distance between the subject object and the nearest candidate reference object in the right direction from the subject object, then the smart guide determination module 136 notifies the smart guide display module 138 to display equal distance guides between the subject object and the nearest candidate reference object in the left direction, and between the subject object and the nearest candidate reference object in the right direction. By way of another example, if the smart guide determination module 136 determines that the distance between the subject object and the nearest candidate reference object in the top direction from the subject object is approximately equal to the distance between the subject object and the nearest candidate reference object in the bottom direction from the subject object, then the smart guide determination module 136 notifies the smart guide display module 138 to display equal distance guides between the subject object and the nearest candidate reference object in the top direction, and between the subject object and the nearest candidate reference object in the bottom direction.

Additionally or alternatively, the subject object can be a freeform gradient color point and reference objects can be objects with bounding boxes. In such situations, a region of interest for the subject object can be determined analogous to the discussion above, except that the length of the subject object is one location (or the length of the geometric shape if the subject object covers multiple locations), and the region of interest can extend to the edge of the digital content or to the edge of the reference object that contains the freeform gradient color points. Bounding box edges of reference object bounding boxes that at least partially overlap the region of interest in each direction are identified, sub-objects are generated from those bounding box edges, and equal distance guides are displayed as discussed above.

In situations in which the subject object is a freeform gradient color point and reference objects are objects with bounding boxes, alignment guides can be displayed by determining when the subject object and a reference object are aligned along either the x-axis or the y-axis in the coordinate system. For example, a subject object and a reference object are horizontally aligned if the value of the y coordinate of the subject object is approximately equal to the value of the y coordinate of the top edge or the bottom edge of the reference object bounding box, and a subject object and a reference object are vertically aligned if the value of the x coordinate of the subject object is approximately equal to the value of the x coordinate of the left edge or the right edge of the reference object bounding box. Two values are approximately equal if the two values are the same or within a threshold amount (e.g., 95% or 99%) of one another. In response to determining that the subject object and a reference object are horizontally or vertically aligned, the smart guide determination module 136 notifies the smart guide display module 138 to display an alignment guide.

Additionally or alternatively, the subject object can be an object with a bounding box and the reference objects can be freeform gradient color points. In such situations, a region of interest for the subject object can be determined analogous to the discussion above, except that the region of interest can extend to the edge of the digital content or to the edge of the reference object that contains the freeform gradient color points. Reference objects that at least partially overlap the region of interest in each direction are identified, distances from the edges of the subject object bounding box to the reference objects are identified, and equal distance guide are displayed as discussed above.

In situations in which the subject object is an object with a bounding box and the reference objects are freeform gradient color points, alignment guides can be displayed by determining when the subject object and a reference object are aligned along either the x-axis or the y-axis in the coordinate system. For example, a subject object and a reference object are horizontally aligned if the value of the y coordinate of the top edge or the bottom edge of the subject object bounding box is approximately equal to the value of the y coordinate of the reference object bounding box, and a subject object and a reference object are vertically aligned if the value of the x coordinate of the left edge or the right edge of the subject object bounding box is approximately equal to the value of the x coordinate of the reference object. Two values are approximately equal if the two values are the same or within a threshold amount (e.g., 95% or 99%) of one another. In response to determining that the subject object and a reference object are horizontally or vertically aligned, the smart guide determination module 136 notifies the smart guide display module 138 to display an alignment guide.

It should also be noted that in situations in which a subject object and/or a reference object is a freeform gradient color point, the snapping module 140 optionally snaps a subject object to a particular location in response to the distance between the subject object and the closest candidate reference object in each of multiple directions in the same dimension (e.g., left and right along the x-axis, up and down along the y-axis) is approximately equal so that the distance between the subject object and the closest candidate reference object in each of multiple directions in the same dimension is the same.

As discussed above, the snapping module 140 implements functionality to snap a subject object to a particular location that is horizontally or vertically aligned with a reference object in response to the subject object not being horizontally or vertically aligned with a reference object but being within a threshold amount of being horizontally or vertically aligned with the reference object. Also as discussed above, the snapping module 140 also implements functionality to snap a subject object to a particular location that is equidistant from two reference objects in response to the subject object not being equidistant from the two reference objects but being within a threshold distance of (e.g., 95% or 99% of) being equidistant from two reference objects. The snapping module 140 can thus snap subject objects that are freeform gradient color points, or subject objects when reference objects are freeform gradient color points, so that the subject object and a reference object are horizontally or vertically aligned, or so that the subject object is equidistant from two reference objects.

By adding the freeform gradient color points as objects in the reference object library 134, the smart guide determination module 136 can generate smart guides for the freeform gradient color points while also generating smart guides for other objects in the digital content. This provides an O (n log n) solution to generating smart guides for freeform gradient color points, where "n" is the number of color points present on the objects in view.

Figure 21:
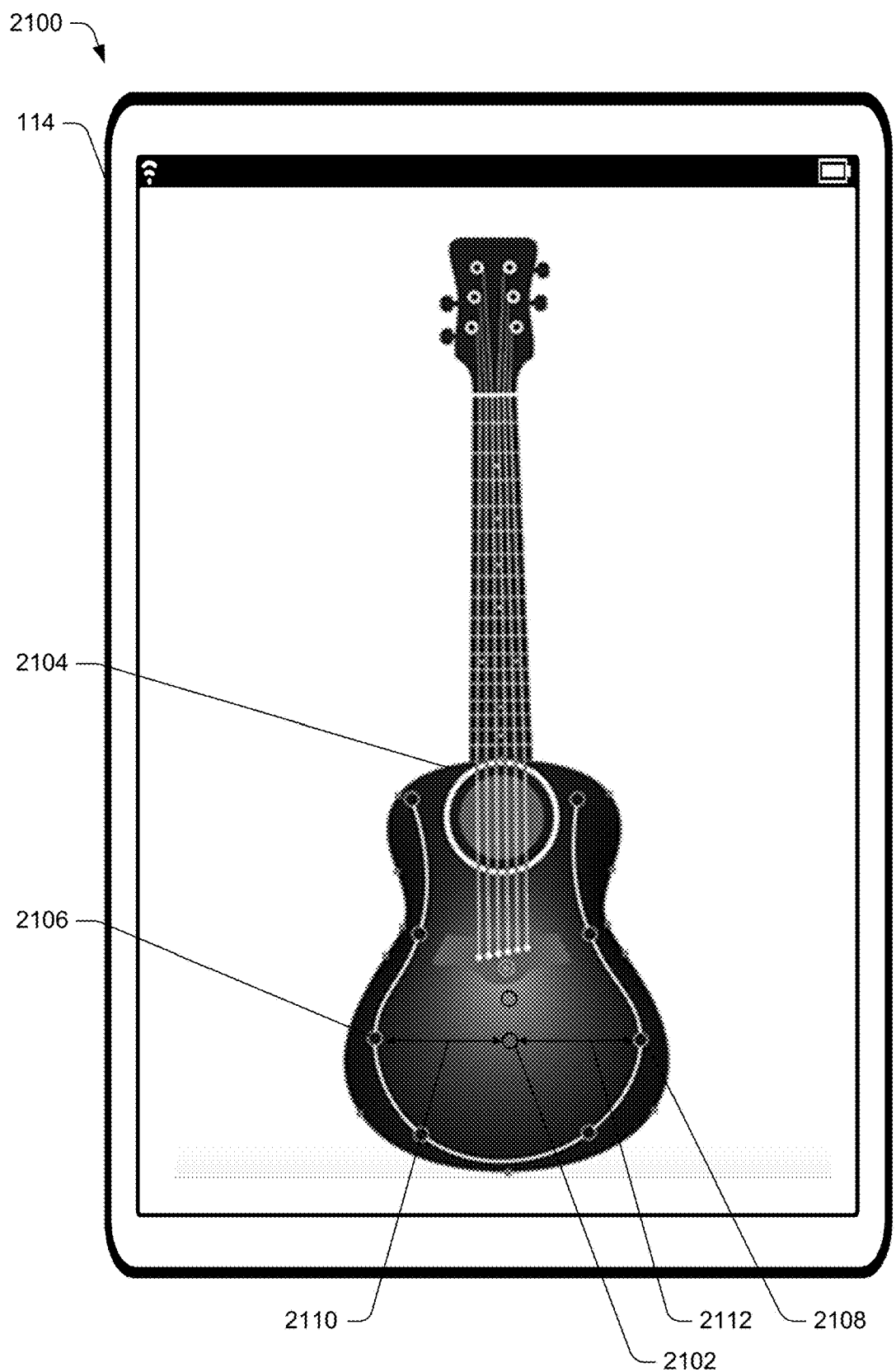
FIGS. 21, 22, and 23 illustrate examples of displaying equal distance guides using the techniques discussed herein.

FIG. 21 illustrates an example 2100 of displaying equal distance guides using the techniques discussed herein. In the example 2100, a subject object 2102 (which is a freeform gradient color point) is displayed as contained within a reference object 2104 (a guitar) on a display device 114. The reference object 2104 includes multiple additional reference objects that are freeform gradient color points, such as reference objects 2106 and 2108. Equal distance guides 2110 and 2112 indicate that the subject object 2102 is equidistant from the reference object 2106 and the reference object 2108. Thus, as illustrated in example 2100, equal distance guides can be displayed based on freeform gradient color points to facilitate placement of additional freeform gradient color points.

Figure 22:
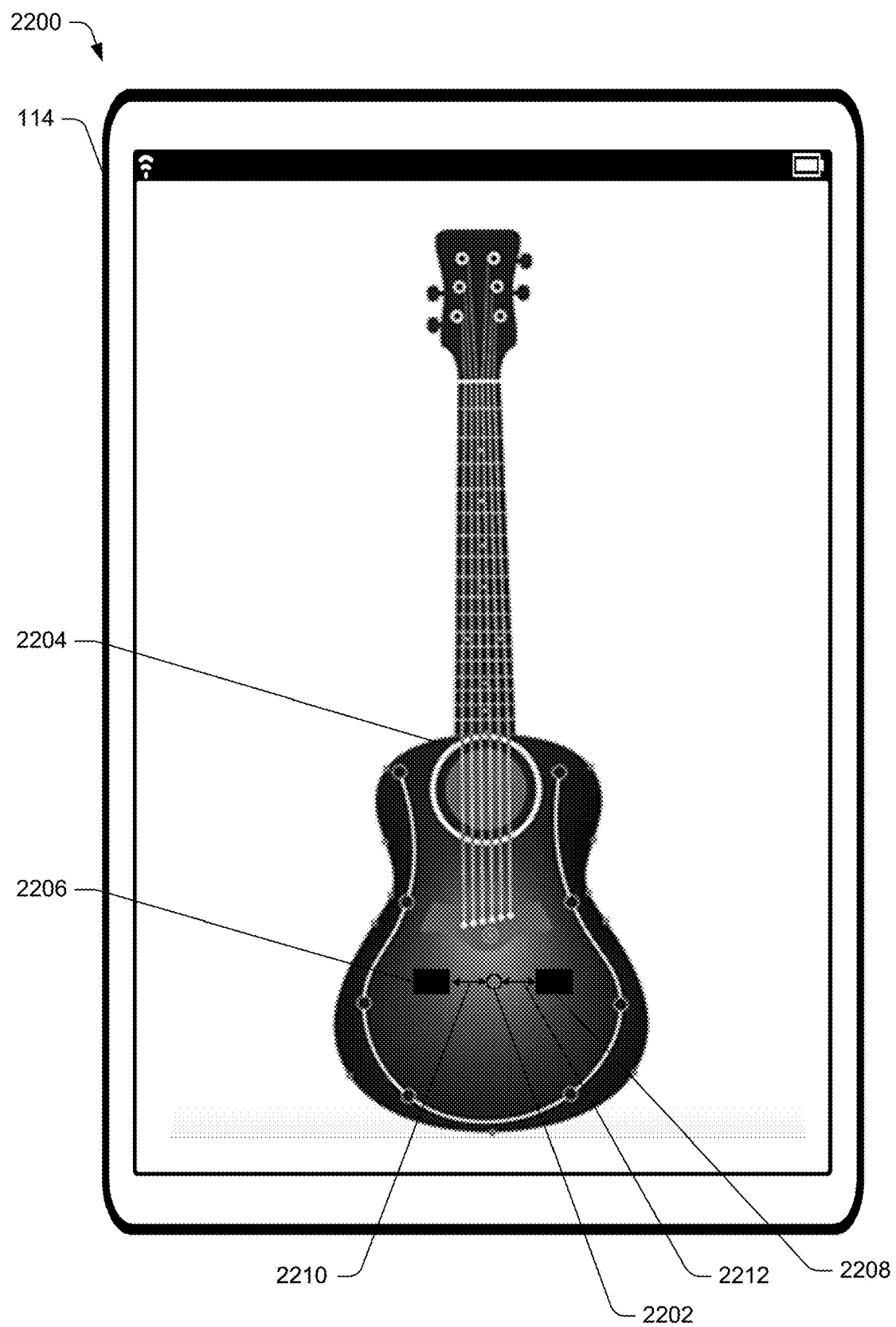

FIG. 22 illustrates an example 2200 of displaying equal distance guides using the techniques discussed herein. In the example 2200, a subject object 2202 (which is a freeform gradient color point) is displayed as contained within a reference object 2204 (a guitar) on a display device 114. The reference object 2204 includes multiple additional reference objects that are bounding boxes, such as reference objects 2206 and 2208. Equal distance guides 2210 and 2212 indicate that the subject object 2202 is equidistant from the reference object 2206 and the reference object 2208. Thus, as illustrated in example 2200, equal distance guides can be displayed based on a source object that is a freeform gradient color point and reference objects with bounding boxes to facilitate placement of additional freeform gradient color points.

Figure 23:
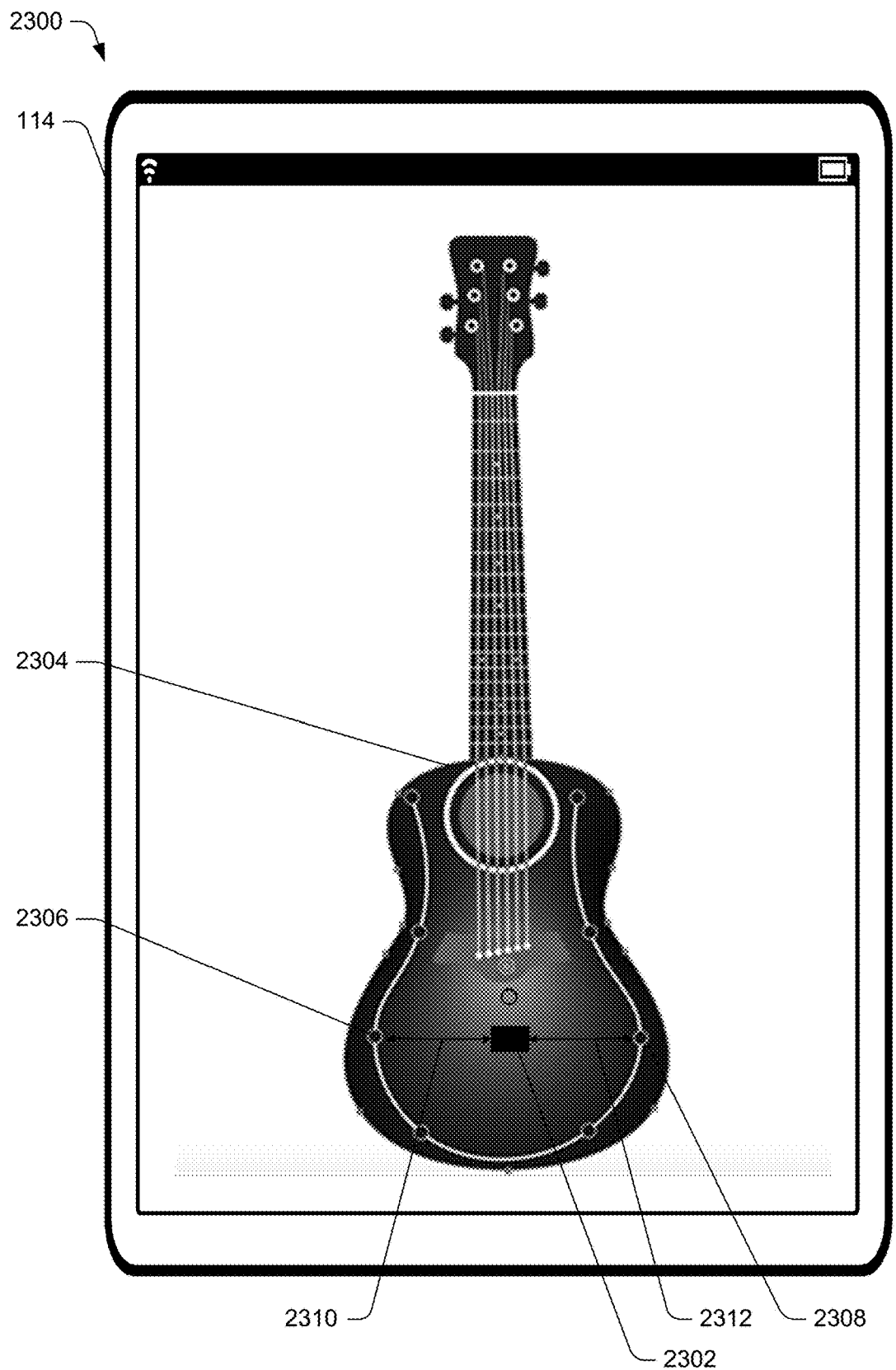

FIG. 23 illustrates an example 2300 of displaying equal distance guides using the techniques discussed herein. In the example 2300, a subject object 2302 with a bounding box is displayed as contained within a reference object 2304 (a guitar) on a display device 114. The reference object 2304 includes multiple additional reference objects that are freeform gradient color points, such as reference objects 2306 and 2308. Equal distance guides 2310 and 2312 indicate that the subject object 2302 is equidistant from the reference object 2306 and the reference object 2308. Thus, as illustrated in example 2300, equal distance guides can be displayed based a source object with a bounding box and reference objects that are freeform gradient color points to facilitate placement of additional freeform gradient color points.

Figure 24:
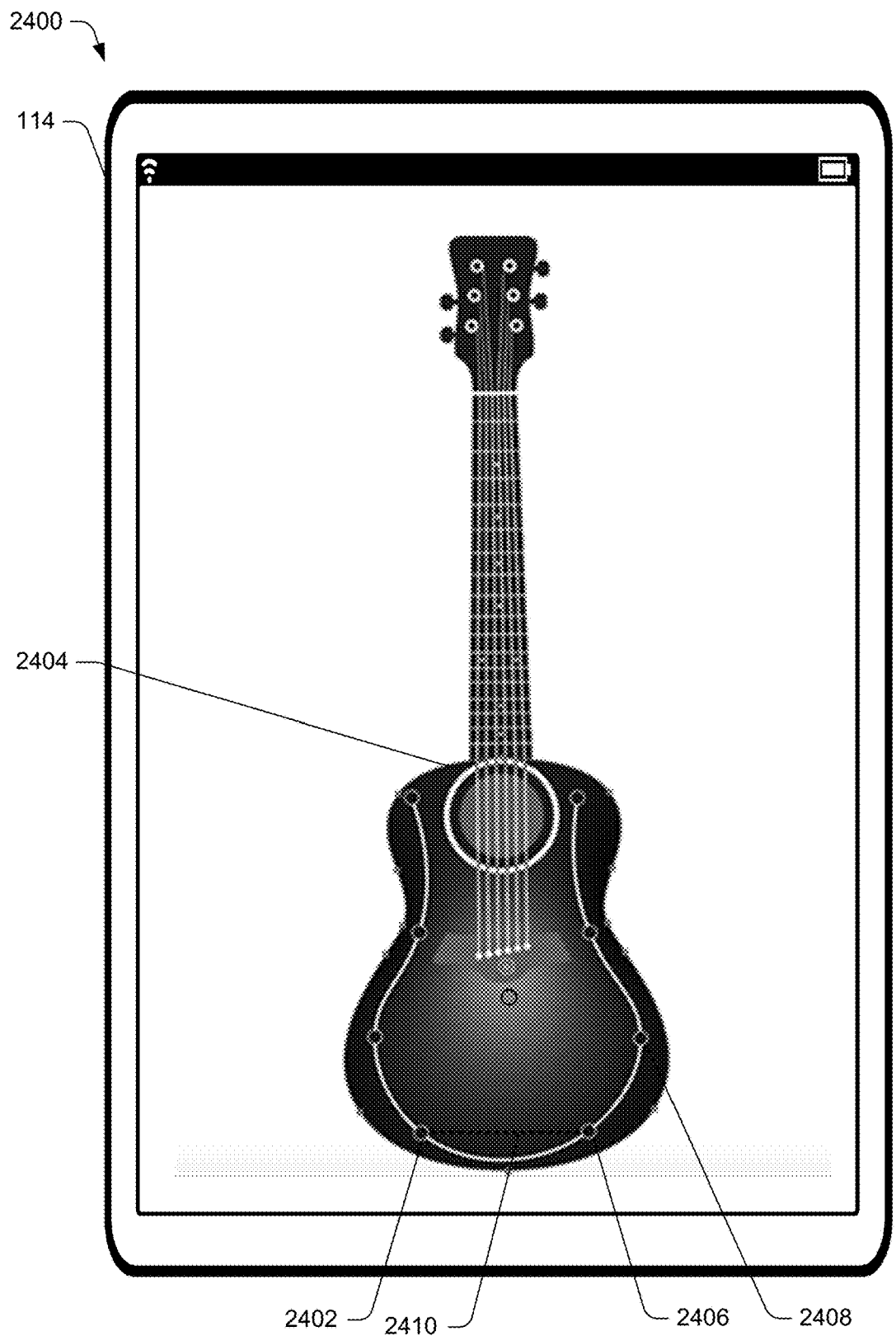
FIGS. 24 and 25 illustrate examples of displaying alignment guides using the techniques discussed herein.

FIG. 24 illustrates an example 2400 of displaying alignment guides using the techniques discussed herein. In the example 2400, a subject object 2402 (which is a freeform gradient color point) is displayed as contained within a reference object 2404 (a guitar) on a display device 114. The reference object 2404 includes multiple additional reference objects that are freeform gradient color points, such as reference objects 2406 and 2408. An alignment guide 2410 indicates that the subject object 2402 is horizontally aligned with reference object 2408. Thus, as illustrated in example 2400, an alignment guide can be displayed between one freeform gradient color point and another freeform gradient color point to facilitate placement of additional freeform gradient color points.

Figure 25:
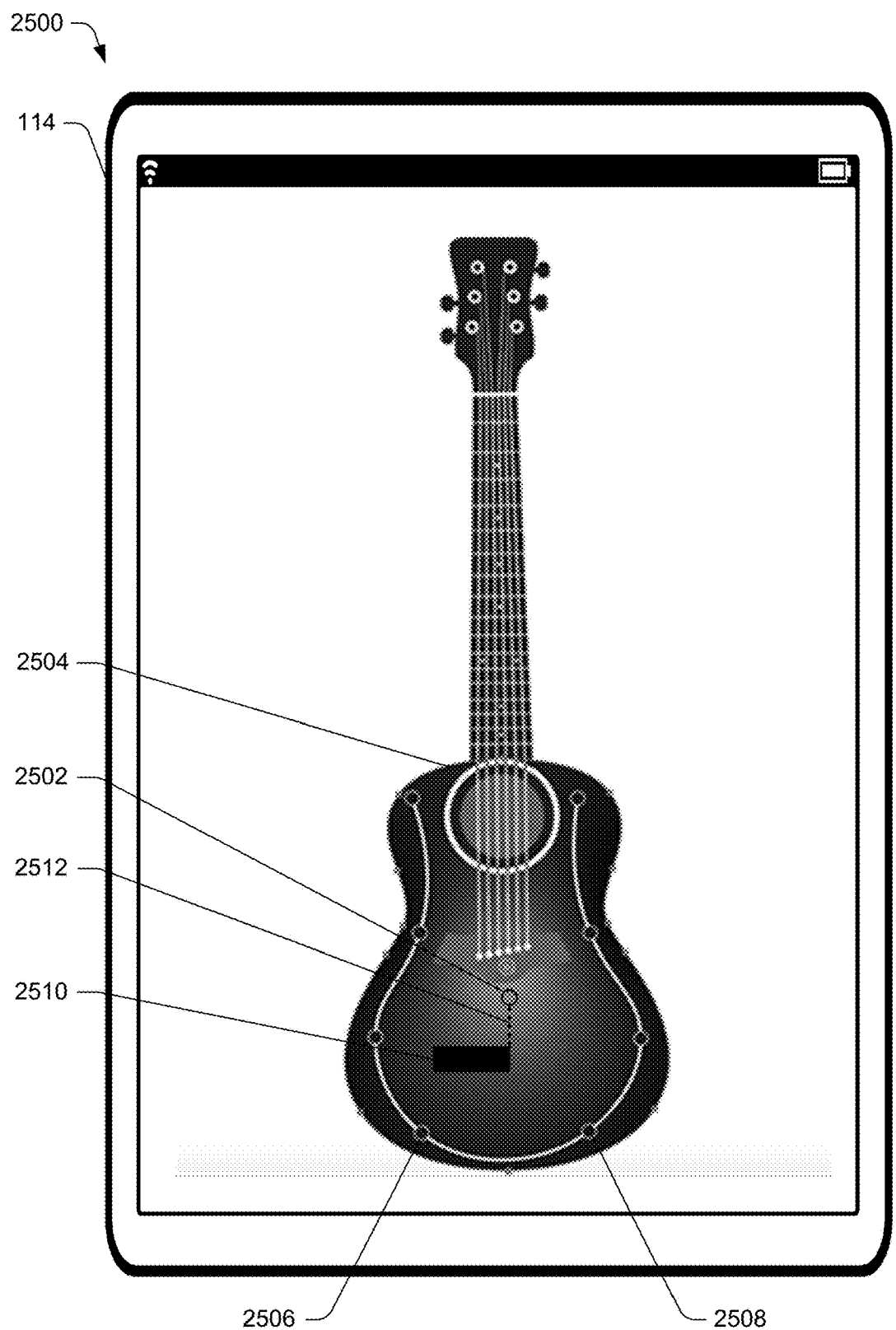

FIG. 25 illustrates an example 2500 of displaying alignment guides using the techniques discussed herein. In the example 2500, a subject object 2502 (which is a freeform gradient color point) is displayed as contained within a reference object 2504 (a guitar) on a display device 114. The reference object 2504 includes multiple additional reference objects that are freeform gradient color points, such as reference objects 2506 and 2508. The reference object 2504 also includes a reference object 2510 with a bounding box. An alignment guide 2512 indicates that the subject object 2502 is vertically aligned with reference object 2508. Thus, as illustrated in example 2500, an alignment guide can be displayed between a freeform gradient color point and reference object with a bounding box to facilitate placement of the freeform gradient color points.

Alternatively, the object 2510 with the bounding box can be the subject object and the object 2502 can be reference object that is a freeform gradient color point. In this situation, example 2500 illustrates an alignment guide can be displayed between a freeform gradient color point and a subject object with a bounding box to facilitate placement of the subject object relative to a freeform gradient color point.

It should be noted that the techniques discussed herein for displaying smart guides for freeform gradient color points can be combined and implemented together with the techniques for displaying smart guides when objects at least partially overlap and/or generating multiple rectangle sub-objects from rectilinear objects. For example, the sub-object generation module 132 can break a rectilinear object into multiple sub-objects that are rectangles, and then generate sub-objects from edges of the generated rectangle sub-objects. As the generated sub-objects are rectangles, the bounding boxes of the generated sub-objects will be the same size as the sub-objects themselves. The smart guide determination module 136 can then display smart guides for freeform gradient color points relative to the rectangles generated from the rectilinear object.

It should also be noted that the techniques discussed herein can be used on their own or in conjunction with conventional techniques for displaying smart guides. For example, the smart guide determination module 136 can implement any of a variety of public and/or proprietary techniques to display smart guides for a subject object and the edges of a bounding box of a reference object that do not at least partially overlap each other. The techniques discussed herein allow for the display of smart guides in additional situations that conventional techniques do not allow, such as when a subject object at least partially overlaps a reference object, for portions of a reference object that are not along an edge of the bounding box of the reference object, for color points, and so forth.

Furthermore, it should be noted that generating sub-objects from a reference object and adding those sub-objects to a reference object library 134 allows existing modules or systems that display smart guides to be easily expanded to incorporate the techniques discussed herein. Once the sub-object is added to the reference object library 134, an existing module or system that displays smart guides can simply treat those sub-objects as it does other reference objects.

It should also be noted that in some of the discussions herein reference is made to displaying smart guides based on determining alignment or distance in the horizontal or vertical directions. Horizontal and vertical directions are an example of a two-axis coordinate system, and the techniques discussed herein can be used with any two-axis coordinate system.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-25.

Figure 26:
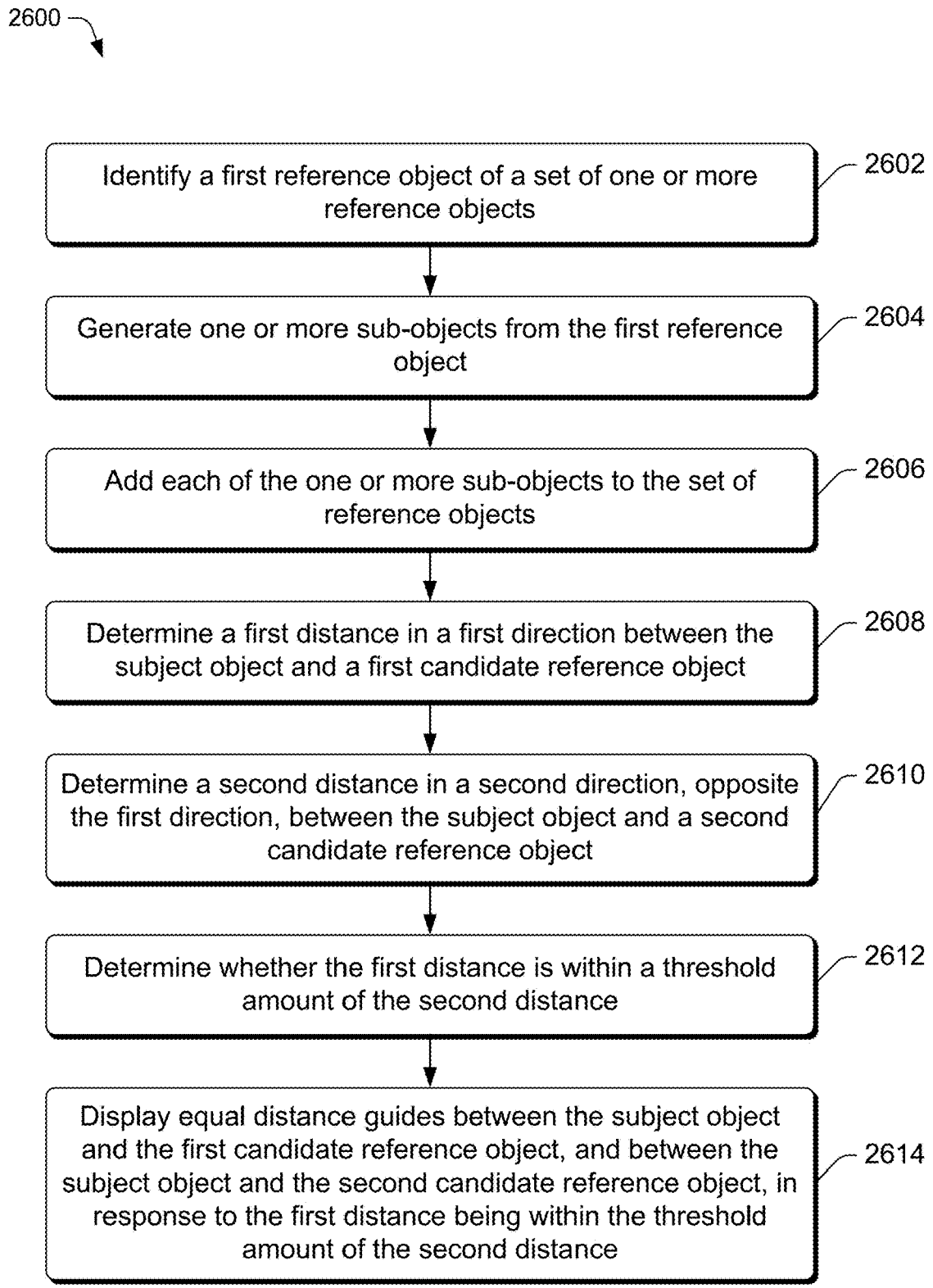
FIG. 26 is a flow diagram depicting a procedure in an example implementation of displaying smart guides for object placement based on sub-objects of reference objects.

FIG. 26 is a flow diagram depicting a procedure in an example implementation of displaying smart guides for object placement based on sub-objects of reference objects. In this example, a first reference object of a set of one or more reference objects is identified (block 2602). The first reference object can be identified in various manners, such as by identifying a reference object in a region of interest, identifying a rectilinear object that is not itself a rectangle (e.g., has more than four sides), identifying an object having freeform gradients, and so forth.

One or more sub-objects are generated from the first reference object (block 2604). These sub-objects can be generated in various manners as discussed above, such as by using one or more edges of the first reference object as the one or more sub-objects, breaking a rectilinear object into multiple rectangles and using the multiple rectangles as the one or more sub-objects, identifying the freeform gradient color points in a reference object and using the freeform gradient color points as the one or more sub-objects, and so forth.

Each of the one or more sub-objects is added to the set of reference objects (block 2606). The sub-objects thus become reference objects that can be used in determining when to display smart guides. A record is optionally maintained of the type of reference object that these sub-objects are (e.g., edges, rectangles, freeform gradient color points, etc.). This record can be maintained in various manners, such as in metadata associated with the sub-object in the set of reference objects, as part of a separate list or database, and so forth.

A first distance in a first direction between the subject object and a first candidate reference object is determined (block 2608). This first candidate reference object can be, for example, one of the sub-objects generated in block 2604.

A second distance in a second direction between the subject object and a second candidate reference object is determined (block 2610). This second candidate reference object is a different reference object than the second candidate reference object, and can be, for example, one of the sub-objects generated in block 2604. The second direction is opposite the first direction. E.g., the first direction can be left and the second direction can be right.

A determination is made as to whether the first distance is within a threshold amount of the second distance (block 2612). The threshold amount can be, for example, the value of one of the two distances being within 95% or 99% of the value of the other of the two distances. The first distance being within a threshold amount of the second distance is also referred to as the first distance and the second distance being approximately equal.

In response to the first distance being within the threshold amount of the second distance, equal distance guides are displayed between the subject object and the first candidate reference object, and between the subject object and the second candidate reference object (block 2614). These equal distance guides can take various forms, such as lines, arrows, or other indicators, and can optionally include extension lines to facilitate viewing of the lines, arrows, or other indicators.

The procedure of FIG. 26 can be performed at any of a variety of different times. For example, the procedure can be performed at the time that a subject object in the digital content is created, in response to smart guide functionality being enabled for the digital content, in response to detecting that the subject object at least partially overlaps a reference object, in response to movement of the subject object by the user, and so forth.

Figure 27:
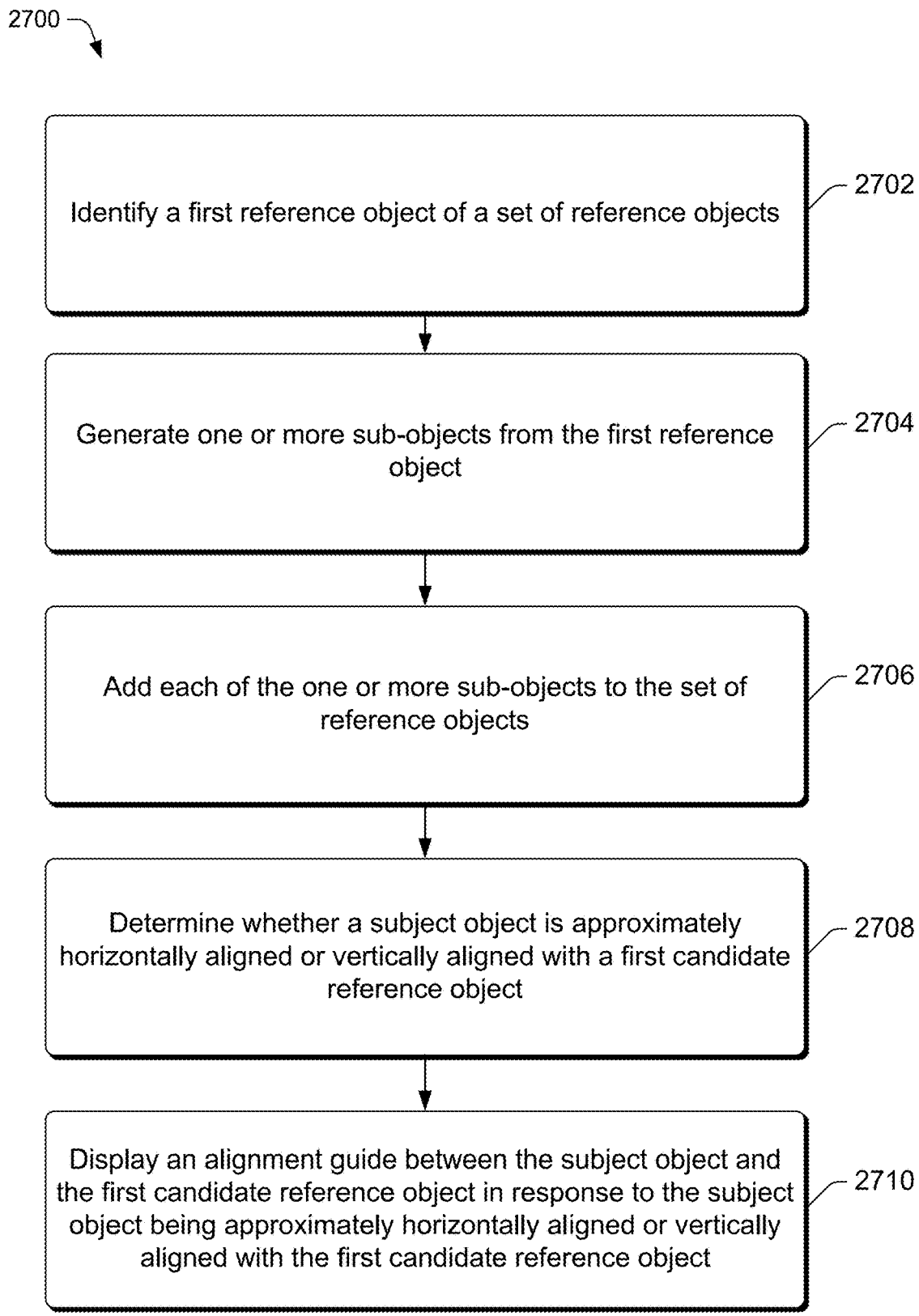
FIG. 27 is a flow diagram depicting another procedure in an example implementation of displaying smart guides for object placement based on sub-objects of reference objects.

FIG. 27 is a flow diagram depicting another procedure in an example implementation of displaying smart guides for object placement based on sub-objects of reference objects. In this example, a first reference object of a set of reference objects is identified (block 2702). The first reference object can be identified in various manners, such as by identifying a rectilinear object that is not itself a rectangle (e.g., has more than four sides), identifying an object having freeform gradients, and so forth.

One or more sub-objects are generated from the first candidate reference object (block 2704). These sub-objects can be generated in various manners as discussed above, such as by breaking a rectilinear object into multiple rectangles and using the multiple rectangles as the one or more sub-objects, identifying the freeform gradient color points in a reference object and using the freeform gradient color points as the one or more sub-objects, and so forth.

Each of the one or more sub-objects is added to the set of reference objects (block 2706). The sub-objects thus become reference objects that can be used in determining when to display smart guides. A record is optionally maintained of the type of reference object that these sub-objects are (e.g., edges, rectangles, freeform gradient color points, etc.). This record can be maintained in various manners, such as in metadata associated with the sub-object in the set of reference objects, as part of a separate list or database, and so forth.

A determination is made as to whether a subject object is approximately horizontally aligned or vertically aligned with a first candidate reference object (block 2708). This horizontal or vertical alignment can be determined based on locations of points (e.g., for freeform gradient color points), based on bounding box edges (e.g., for rectangles generated from a rectilinear object or other reference objects), and so forth as discussed above.

In response to the subject object being approximately horizontally aligned or vertically aligned with the second candidate reference object, an alignment guide is displayed between the subject object and the second candidate reference object (block 2710). The alignment guide can take various forms, such as lines, arrows, or other indicators.

The procedure of FIG. 27 can be performed at any of a variety of different times. For example, the procedure can be performed at the time that a subject object in the digital content is created, in response to smart guide functionality being enabled for the digital content, in response to movement of the subject object by the user, and so forth.

Example System and Device

Figure 28:
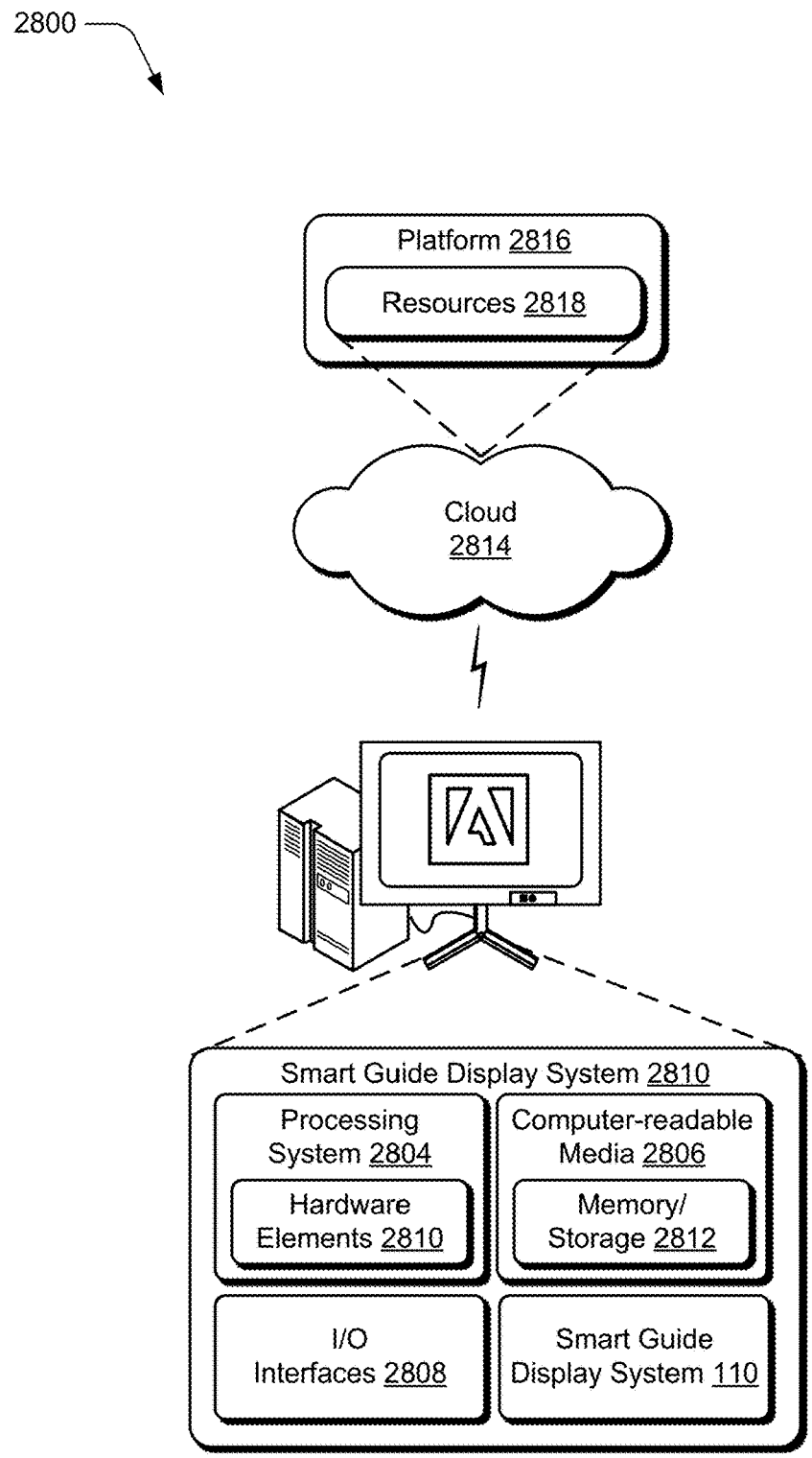
FIG. 28 illustrates an example system including various components of an example device that can be implemented as any type of computing device as described and/or utilize with reference to FIGS. 1-27 to implement aspects of the techniques described herein.

FIG. 28 illustrates an example system generally at 2800 that includes an example computing device 2802 that is representative of one or more computing systems and/or devices that may implement the various techniques described herein. This is illustrated through inclusion of the smart guide display module 104. The computing device 2802 may be, for example, a server of a service provider, a device associated with a client (e.g., a client device), an on-chip system, and/or any other suitable computing device or computing system.

The example computing device 2802 as illustrated includes a processing system 2804, one or more computer-readable media 2806, and one or more I/O interface 2808 that are communicatively coupled, one to another. Although not shown, the computing device 2802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2804 is representative of functionality to perform one or more operations using hardware. Accordingly, the processing system 2804 is illustrated as including hardware element 2810 that may be configured as processors, functional blocks, and so forth. This may include implementation in hardware as an application specific integrated circuit or other logic device formed using one or more semiconductors. The hardware elements 2810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2806 is illustrated as including memory/storage 2812. The memory/storage 2812 represents memory/storage capacity associated with one or more computer-readable media. The memory/storage component 2812 may include volatile media (such as random access memory (RAM)) and/or nonvolatile media (such as read only memory (ROM), Flash memory, optical disks, magnetic disks, and so forth). The memory/storage component 2812 may include fixed media (e.g., RAM, ROM, a fixed hard drive, and so on) as well as removable media (e.g., Flash memory, a removable hard drive, an optical disc, and so forth). The computer-readable media 2806 may be configured in a variety of other ways as further described below.

Input/output interface(s) 2808 are representative of functionality to allow a user to enter commands and information to computing device 2802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 2802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2810 and computer-readable media 2806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2810. The computing device 2802 may be configured to implement particular instructions and/or functions corresponding to the software and/or hardware modules. Accordingly, implementation of a module that is executable by the computing device 2802 as software may be achieved at least partially in hardware, e.g., through use of computer-readable storage media and/or hardware elements 2810 of the processing system 2804. The instructions and/or functions may be executable/operable by one or more articles of manufacture (for example, one or more computing devices 2802 and/or processing systems 2804) to implement techniques, modules, and examples described herein.

The techniques described herein may be supported by various configurations of the computing device 2802 and are not limited to the specific examples of the techniques described herein. This functionality may also be implemented all or in part through use of a distributed system, such as over a "cloud" 2814 via a platform 2816 as described below.

The cloud 2814 includes and/or is representative of a platform 2816 for resources 2818. The platform 2816 abstracts underlying functionality of hardware (e.g., servers) and software resources of the cloud 2814. The resources 2818 may include applications and/or data that can be utilized while computer processing is executed on servers that are remote from the computing device 2802. Resources 2818 can also include services provided over the Internet and/or through a subscriber network, such as a cellular or Wi-Fi network.

The platform 2816 may abstract resources and functions to connect the computing device 2802 with other computing devices. The platform 2816 may also serve to abstract scaling of resources to provide a corresponding level of scale to encountered demand for the resources 2818 that are implemented via the platform 2816. Accordingly, in an interconnected device embodiment, implementation of functionality described herein may be distributed throughout the system 2800. For example, the functionality may be implemented in part on the computing device 2802 as well as via the platform 2816 that abstracts the functionality of the cloud 2814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate digital content, a method implemented by at least one computing device, the method comprising:
    identifying a first reference object of a set of one or more reference objects in digital content;
    generating one or more sub-objects from the first reference object;
    adding each of the one or more sub-objects to the set of reference objects as a reference object;
    determining a first distance in a first direction between a subject object and a first candidate reference object in the set of reference objects, the first candidate reference object being one of the one or more sub-objects;
    determining a second distance in a second direction between the subject object and a second candidate reference object in the set of reference objects, the first direction being opposite the second direction;
    determining whether the first distance is within a threshold amount of the second distance; and
    displaying, in response to the first distance being within the threshold amount of the second distance, equal distance guides between the subject object and the first candidate reference object, and between the subject object and the second candidate reference object.

2. The method as recited in claim 1, wherein the subject object at least partially overlaps the first candidate reference object.

3. The method as recited in claim 1, wherein for each edge of a subject object bounding box, a region of interest extends outward from the edge of the subject object bounding box to an edge of the digital content, in a direction perpendicular to the edge of the subject object bounding box and for a length of the edge of the subject object bounding box, wherein the first reference object at least partially overlaps a region of interest of the subject object, and wherein the one or more sub-objects comprise an edge of a bounding box of the first reference object.

4. The method as recited in claim 3, wherein the first candidate reference object is contained within another reference object.

5. The method as recited in claim 3, wherein the generating one or more sub-objects from the first reference object includes:
    generating a sub-object from a bottom edge of a bounding box of the first reference object in response to the first reference object being located in a region of interest extending outward from a top edge of the subject object bounding box;
    generating a sub-object from a top edge of the bounding box of the first reference object in response to the first reference object being located in a region of interest extending outward from a bottom edge of the subject object bounding box;
    generating a sub-object from a left edge of the bounding box of the first reference object in response to the first reference object being located in a region of interest extending outward from a right edge of the subject object bounding box; and
    generating a sub-object from a right edge of the bounding box of the first reference object in response to the first reference object being located in a region of interest extending outward from a left edge of the subject object bounding box.

6. The method as recited in claim 3, wherein a sub-object generated from a particular edge of a bounding box of the first reference object is located at a same location as the particular edge, has a same length as the particular edge, and has a width smaller than a width of the first reference object.

7. The method as recited in claim 1, wherein the first reference object comprises a rectilinear object, and the generating comprises breaking the first reference object into multiple sub-objects that are rectangles and that together make up the first reference object.

8. The method as recited in claim 7, wherein the first candidate reference object is part of the first reference object, and wherein displaying the equal distance guides includes displaying an equal distance guide between the subject object and the first reference object without displaying the first candidate reference object separately from the first reference object.

9. The method as recited in claim 7, wherein the first candidate reference object is part of the first reference object, and wherein displaying the equal distance guides includes displaying an equal distance guide between the subject object and the first reference object without regard for the bounding box of the first reference object.

10. The method as recited in claim 1, wherein the one or more sub-objects comprise multiple edges of a rectangle that is one of multiple rectangles that make up the first reference object, wherein the first candidate reference object comprises one of the multiple edges of the rectangle, and wherein the second candidate reference object comprises a different one of the multiple edges of the rectangle.

11. The method as recited in claim 1, wherein the first reference object comprises a rectilinear object, wherein the generating comprises breaking the first reference object into multiple sub-objects that are rectangles and that together make up the first reference object, wherein the first candidate reference object is one of the multiple sub-objects, and the method further comprising:
   determining when an edge of a subject object bounding box is horizontally aligned or vertically aligned with an edge of the first candidate reference object; and
   displaying, in response to the edge of the subject object bounding box being horizontally aligned or vertically aligned with the edge of the first candidate reference object, an alignment guide between the edge of the subject object and the edge of the second candidate reference object.

12. The method as recited in claim 1, wherein generating the one or more sub-objects comprises identifying, as each of the one or more sub-objects, a freeform gradient color point of the first reference object, and wherein each of the subject object, the first candidate reference object, and the second candidate reference object is a different freeform gradient color point of the first reference object.

13. The method as recited in claim 1, wherein generating the one or more sub-objects comprises identifying, as each of the one or more sub-objects, a freeform gradient color point of the first reference object, wherein each of the first candidate reference object and the subject object is a different freeform gradient color point of the first reference object, the method further comprising:
   determining whether the subject object is horizontally aligned or vertically aligned with the first candidate reference object; and
   displaying an alignment guide between the subject object and the first candidate reference object in response to the subject object being horizontally aligned or vertically aligned with the first candidate reference object.

14. In a digital medium environment to generate digital content, a computing device comprising:
   a processor; and
   computer-readable storage media having stored thereon multiple instructions that, responsive to execution by the processor, cause the processor to perform operations including:
      identifying a first reference object of a set of reference objects in digital content, the first reference object being a rectilinear object;
      generating one or more sub-objects from the first reference object by breaking the first reference object into multiple sub-objects that are rectangles and that together make up the first reference object;
      adding each of the one or more sub-objects to the set of reference objects as a reference object;
      determining whether an edge of a subject object bounding box is approximately horizontally aligned or vertically aligned with an edge of a first candidate reference object, the first candidate reference object being one of the one or more sub-objects; and
      displaying, in response to the edge of the subject object bounding box being approximately horizontally aligned or vertically aligned with the edge of the first candidate reference object, an alignment guide between the edge of the subject object bounding box and the edge of the first candidate reference object.

15. The computing device as recited in claim 14, the operations further including:
   determining a first distance in a first direction between the subject object and a second candidate reference object in the set of reference objects, the second candidate reference object being one of the one or more sub-objects;
   determining a second distance in a second direction between the subject object and a third candidate reference object in the set of reference objects, the first direction being opposite the second direction;
   determining whether the first distance is within a threshold amount of the second distance; and
   displaying, in response to the first distance being within the threshold amount of the second distance, equal distance guides between the subject object and the second candidate reference object, and between the subject object and the third candidate reference object.

16. The computing device as recited in claim 15, wherein for each edge of a subject object bounding box, a region of interest extends outward from the edge of the subject object bounding box to an edge of the digital content, in a direction perpendicular to the edge of the subject object bounding box and for a length of the edge of the subject object bounding box, wherein the first candidate reference object at least partially overlaps a region of interest of the subject object, and wherein the one or more sub-objects comprise an edge of a bounding box of the first candidate reference object.

17. The computing device as recited in claim 14, the operations further including:
   receiving a user input to transform the first reference object;
   maintaining, for the first reference object, a transformation matrix indicating changes made to the first reference object in response to the user input; and
   applying the transformation matrix to each of the multiple sub-objects that are the rectangles that together make up the first reference object.

18. The computing device as recited in claim 14, the operations further including:
   receiving a user input to move the first reference object;
   maintaining, for the first reference object, a translation matrix indicating movement of the first reference object in response to the user input; and
   applying the translation matrix to each of the multiple sub-objects that are the rectangles that together make up the first reference object.

19. In a digital medium environment to generate digital content, a computing device comprising:
   a processor; and
   computer-readable storage media having stored thereon multiple instructions that, responsive to execution by the processor, cause the processor to perform operations including:
      identifying a first reference object of a set of reference objects in digital content, the first reference object including one or more freeform gradient color points;
      generating one or more sub-objects from the first reference object by identifying, as a sub-object, each of the one or more freeform gradient color points;
      adding each of the one or more sub-objects to the set of reference objects as a reference object;

determining whether a subject object is approximately horizontally aligned or vertically aligned with a first candidate reference object, the first candidate reference object being one of the one or more sub-objects; and displaying, in response to the subject object being approximately horizontally aligned or vertically aligned with the first candidate reference object, an alignment guide between the subject object and the first candidate reference object.

20. The computing device as recited in claim 19, the operations further including:

determining a first distance in a first direction between the subject object and a second candidate reference object in the set of reference objects, the second candidate reference object being one of the one or more sub-objects;

determining a second distance in a second direction between the subject object and a third candidate reference object in the set of reference objects, the first direction being opposite the second direction;

determining whether the first distance is within a threshold amount of the second distance; and displaying, in response to the first distance being within the threshold amount of the second distance, equal distance guides between the subject object and the second candidate reference object, and between the subject object and the third candidate reference object.

* * * * *